(12) United States Patent
Liao et al.

(10) Patent No.: US 11,262,538 B2
(45) Date of Patent: Mar. 1, 2022

(54) PHOTOGRAPHING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Cheng-Yuan Liao, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 595 days.

(21) Appl. No.: 16/149,279

(22) Filed: Oct. 2, 2018

(65) Prior Publication Data

US 2019/0384038 A1    Dec. 19, 2019

(30) Foreign Application Priority Data

Jun. 13, 2018 (TW) ................................ 107120263

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC .. G02B 27/0025; G02B 13/00; G02B 13/001; G02B 13/0015; G02B 13/002; G02B 13/0045; G02B 13/04; G02B 13/06; G02B 13/18; G02B 9/00; G02B 9/02; G02B 9/62; G02B 5/005; G02B 3/02; G02B 3/04; G02B 1/00; G02B 1/041; H04N 5/2252; H04N 5/2253; H04N 5/2254; H04N 5/335

USPC ....... 359/642, 682, 692, 708, 713, 738–739, 359/750–758; 348/294, 360
See application file for complete search history.

(56) References Cited

U.S. PATENT DOCUMENTS

| | | | |
|---|---|---|---|
| 9,823,445 B2 | 11/2017 | Chen et al. | |
| 2001/0022698 A1 | 9/2001 | Sato | |
| 2012/0314301 A1* | 12/2012 | Huang | G02B 13/0045 359/713 |
| 2014/0118845 A1* | 5/2014 | Komiyama | G02B 13/0045 359/713 |

(Continued)

FOREIGN PATENT DOCUMENTS

| | | |
|---|---|---|
| CN | 202083826 U | 12/2011 |
| JP | 2001318310 A | 11/2001 |

(Continued)

OTHER PUBLICATIONS

Indian Examination Report dated May 5, 2021 as received in application No. 201834042959.

*Primary Examiner* — Nicholas R. Pasko
(74) *Attorney, Agent, or Firm* — Maschoff Brennan

(57) ABSTRACT

A photographing optical lens system includes six lens elements. The six lens elements are, in order from an object side to an image side, a first lens element, a second lens element, a third lens element, a fourth lens element, a fifth lens element and a sixth lens element. The second lens element has negative refractive power. The third lens element with negative refractive power has an image-side surface being concave in a paraxial region thereof. The fifth lens element has an image-side surface being concave in a paraxial region thereof. The sixth lens element has positive refractive power.

26 Claims, 20 Drawing Sheets

(56) References Cited

U.S. PATENT DOCUMENTS

| | | | | |
|---|---|---|---|---|
| 2015/0015971 | A1* | 1/2015 | Huang | G02B 13/18 |
| | | | | 359/713 |
| 2016/0187617 | A1* | 6/2016 | Komiyama | G02B 13/18 |
| | | | | 359/713 |
| 2017/0307851 | A1* | 10/2017 | Chen | G02B 9/62 |
| 2018/0188473 | A1 | 7/2018 | Kanzaki | |
| 2019/0310442 | A1* | 10/2019 | Ikeo | H04N 5/23212 |
| 2020/0124826 | A1* | 4/2020 | Kitsu | H04N 5/2252 |

FOREIGN PATENT DOCUMENTS

| | | |
|---|---|---|
| JP | 2014085559 A | 5/2014 |
| JP | 2015034922 A | 2/2015 |
| JP | 2017003784 A | 1/2017 |
| TW | I582457 B | 5/2017 |
| TW | I616677 B | 3/2018 |

\* cited by examiner

PHOTOGRAPHING OPTICAL LENS SYSTEM, IMAGE CAPTURING UNIT AND ELECTRONIC DEVICE

RELATED APPLICATIONS

This application claims priority to Taiwan Application 107120263, filed on Jun. 13, 2018, which is incorporated by reference herein in its entirety.

BACKGROUND

Technical Field

The present disclosure relates to a photographing optical lens system, an image capturing unit and an electronic device, more particularly to a photographing optical lens system and an image capturing unit applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, a desirable aperture size, miniaturization or sufficient field of view. Accordingly, the present disclosure provides an optical system satisfying the aforementioned requirements.

SUMMARY

According to one aspect of the present disclosure, a photographing optical lens system includes six lens elements. The six lens elements are, in order from an object side to an image side, a first lens element, a second lens element, a third lens element, a fourth lens element, a fifth lens element and a sixth lens element. The second lens element has negative refractive power. The third lens element with negative refractive power has an image-side surface being concave in a paraxial region thereof. The fifth lens element has an image-side surface being concave in a paraxial region thereof. The sixth lens element has positive refractive power. When a curvature radius of an object-side surface of the third lens element is R5, a curvature radius of the image-side surface of the third lens element is R6, an axial distance between the first lens element and the second lens element is T12, an axial distance between the second lens element and the third lens element is T23, a focal length of the photographing optical lens system is f, and an axial distance between an object-side surface of the first lens element and an image surface is TL, the following conditions are satisfied:

$-0.50 < (R5+R6)/(R5-R6) < 2.0;$ $0.95 < T23/T12 < 10.0;$ and $0 < f/TL < 0.65.$ According to another aspect of the present disclosure, a photographing optical lens system includes six lens elements. The six lens elements are, in order from an object side to an image side, a first lens element, a second lens element, a third lens element, a fourth lens element, a fifth lens element and a sixth lens element. The second lens element has negative refractive power. The third lens element with negative refractive power has an image-side surface being concave in a paraxial region thereof. The fourth lens element has positive refractive power. The fifth lens element has an image-side surface being concave in a paraxial region thereof. The sixth lens element has positive refractive power. When a curvature radius of an object-side surface of the third lens element is R5, a curvature radius of the image-side surface of the third lens element is R6, an axial distance between the first lens element and the second lens element is T12, an axial distance between the second lens element and the third lens element is T23, a focal length of the photographing optical lens system is f, a focal length of the third lens element is f3, a focal length of the fourth lens element is f4, and an axial distance between an object-side surface of the first lens element and an image surface is TL, the following conditions are satisfied:

$-1.0 < (R5+R6)/(R5-R6) < 2.0;$ $0.95 < T23/T12 < 10.0;$ $0 < f/TL < 0.65;$ and $-3.0 < f3/f4 < 0.$ According to still another aspect of the present disclosure, an image capturing unit includes the aforementioned photographing optical lens system and an image sensor. The image sensor is disposed on the image surface of the photographing optical lens system.

According to yet another aspect of the present disclosure, an electronic device includes the aforementioned image capturing unit.

According to yet still another aspect of the present disclosure, a photographing optical lens system includes six lens elements. The six lens elements are, in order from an object side to an image side, a first lens element, a second lens element, a third lens element, a fourth lens element, a fifth lens element and a sixth lens element. The second lens element has negative refractive power. The third lens element with negative refractive power has an image-side surface being concave in a paraxial region thereof. The fourth lens element has positive refractive power. The fifth lens element has an image-side surface being concave in a paraxial region thereof. The sixth lens element has positive refractive power. When a curvature radius of an object-side surface of the third lens element is R5, a curvature radius of the image-side surface of the third lens element is R6, an axial distance between the first lens element and the second lens element is T12, an axial distance between the second lens element and the third lens element is T23, a focal length of the photographing optical lens system is f, a focal length of the second lens element is f2, a focal length of the third lens element is f3, a focal length of the fourth lens element is f4, an Abbe number of the fourth lens element is V4, and an Abbe number of the fifth lens element is V5, the following conditions are satisfied:

$-1.0 < (R5+R6)/(R5-R6) < 3.0;$ $0.20 < T23/T12 < 50.0;$ $-3.0<f3/f4<0$;

$20<V4+V5<50$; and $-0.42<f/f2<0$.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens system includes six lens elements. The six lens elements are, in order from an object side to an image side, a first lens element, a second lens element, a third lens element, a fourth lens element, a fifth lens element and a sixth lens element.

The first lens element can have an object-side surface being convex in a paraxial region thereof and an image-side surface being concave in a paraxial region thereof. Therefore, it is favorable for reducing an incident angle of peripheral light of the first lens element so as to allow the photographing optical lens system to obtain a large angle of view.

The second lens element has negative refractive power; therefore, it is favorable for obtaining the proper refractive power of the second lens element along with the first lens element so as to prevent the first lens element from generating aberrations due to overly large curvature. The second lens element can have an object-side surface being convex in a paraxial region thereof and an image-side surface being concave in a paraxial region thereof; therefore, it is favorable for helping the first lens element to obtain a large angle of view and correcting astigmatism so as to balance the image quality between the image center and the image periphery.

Figure 15:
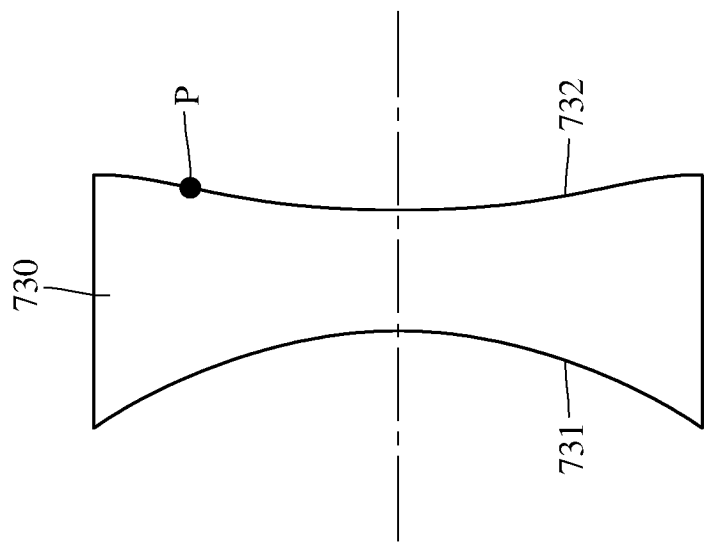
FIG. 15 shows a schematic view of an inflection point on an image-side surface of a third lens element according to the 7th embodiment of the present disclosure.

The third lens element has negative refractive power; therefore, it is favorable for reducing spherical aberration when configured with the second lens element. The third lens element has an image-side surface being concave in a paraxial region thereof; therefore, it is favorable for obtaining a retro-focus lens system so as to enlarge a field of view and capture more information. The image-side surface of the third lens element can have at least one inflection point; therefore, it is favorable for correcting aberrations at the periphery of the photographing optical lens system and reducing the total length of the photographing optical lens system so as to balance between image quality and compactness. Please refer to FIG. 15, which shows a schematic view of an inflection point P on an image-side surface of a third lens element according to the 7th embodiment of the present disclosure.

The fourth lens element can have positive refractive power. Therefore, it is favorable for balancing negative power on the object side of the photographing optical lens system so as to control the size of the photographing optical lens system and increase applicable range of applications.

The fifth lens element has an image-side surface being concave in a paraxial region thereof; therefore, it is favorable for reducing the back focal length of the photographing optical lens system so as to achieve compactness. The fifth lens element can have an object-side surface being convex in a paraxial region thereof; therefore, it is favorable for balancing light rays in both sagittal and tangential directions so as to correct astigmatism of the photographing optical lens system.

The sixth lens element has positive refractive power; therefore, it is favorable for obtaining sufficient light convergence ability so as to reduce the total length of the photographing optical lens system and satisfy the compactness requirement. The sixth lens element can have an object-side surface being convex in a paraxial region thereof and an image-side surface being convex in a paraxial region thereof; therefore, it is favorable for obtaining the light convergence ability to control the size of the photographing optical lens system so as to become applicable to various types of applications.

When a curvature radius of an object-side surface of the third lens element is R5, and a curvature radius of the image-side surface of the third lens element is R6, the following condition is satisfied: $-1.0<(R5+R6)/(R5-R6)$ <3.0. Therefore, it is favorable for controlling the shape of the third lens element so as to strengthen refractive power on the image side of the third lens element, thereby correcting aberrations. Preferably, the following condition can be satisfied: $-1.0<(R5+R6)/(R5-R6)<2.0$. More preferably, the following condition can be satisfied: $-0.50<(R5+R6)/(R5-R6)<2.0$. Much more preferably, the following condition can also be satisfied: $-0.30<(R5+R6)/(R5-R6)<1.0$.

When an axial distance between the first lens element and the second lens element is T12, and an axial distance between the second lens element and the third lens element is T23, the following condition is satisfied: $0.20<T23/T12<50.0$. Therefore, it is favorable for arranging proper axial gaps between adjacent lens elements of the first lens element, the second lens element and third lens element so as to improve assembling of the lens elements and balance the configuration of the photographing optical lens system. Preferably, the following condition can be satisfied: $0.40<T23/112<15.0$. More preferably, the following condition can also be satisfied: $0.95<T23/T12<10.0$.

When a focal length of the photographing optical lens system is f, and an axial distance between the object-side surface of the first lens element and an image surface is TL, the following condition can be satisfied: $0<f/TL<0.65$. Therefore, it is favorable for simultaneously balancing the total length of the photographing optical lens system and controlling the angle of view so as to obtain a retro-focus lens system. Preferably, the following condition can also be satisfied: $0<f/TL<0.25$.

When a focal length of the third lens element is f3, and a focal length of the fourth lens element is f4, the following condition can be satisfied: $-3.0<f3/f4<0$. Therefore, it is favorable for distributing refractive power between the third lens element and the fourth lens element so as to provide sufficient light controlling ability on the object side of the third lens element.

When an Abbe number of the fourth lens element is V4, and an Abbe number of the fifth lens element is V5, the following condition can be satisfied: $20<V4+V5<60$. Therefore, it is favorable for balancing the refraction of different wavelengths so as to correct chromatic aberration. Furthermore, it is favorable for increasing the density difference between the materials of the fourth lens element, the fifth lens element and air so as to obtain stronger light controlling ability in finite space. Preferably, the following condition can also be satisfied: $20<V4+V5<50$.

When the focal length of the photographing optical lens system is f, and a focal length of the second lens element is f2, the following condition can be satisfied: $-0.42<f/f2<0$. Therefore, it is favorable for correcting aberrations generated by the first lens element and providing the second lens element with proper refractive power so as to improve image quality.

When the focal length of the photographing optical lens system is f, and the focal length of the fourth lens element is f4, the following condition can be satisfied: $0.34<f/f4<1.0$. Therefore, it is favorable for controlling the refractive power of the fourth lens element so as to control the distribution of positive refractive power and the physical size of the photographing optical lens system.

When a curvature radius of an object-side surface of the fourth lens element is R7, and a curvature radius of an image-side surface of the fourth lens element is R8, the following condition can be satisfied: $-0.50<(R7+R8)/(R7-R8)<0.10$. Therefore, it is favorable for balancing the shapes of the object-side surface and the image-side surface of the fourth lens element so as to prevent severe aberrations due to overly large curvatures of surfaces of the fourth lens element.

When an axial distance between the third lens element and the fourth lens element is T34, and an axial distance between the fifth lens element and the sixth lens element is T56, the following condition can be satisfied: $0.50<T34/T56<5.0$. Therefore, it is favorable for distributing the space of the photographing optical lens system so as to reduce the sensitivity and increase the performance of the photographing optical lens system.

When a curvature radius of the image-side surface of the first lens element is R2, and a curvature radius of the image-side surface of the second lens element is R4, the following condition can be satisfied: $2.40<R2/R4<15.0$. Therefore, it is favorable for receiving light from a wide field of view so as to achieve wide-angle lens configuration with the first lens element and the second lens element.

When a focal length of the first lens element is f1, the focal length of the second lens element is f2, and the focal length of the third lens element is f3, the following condition can be satisfied: $0<(|f2|+|f3|)/|f1|<0.70$. Therefore, it is favorable for configuring the first lens element as a correction lens element so as to improve the image quality in the off-axis region.

Figure 16:
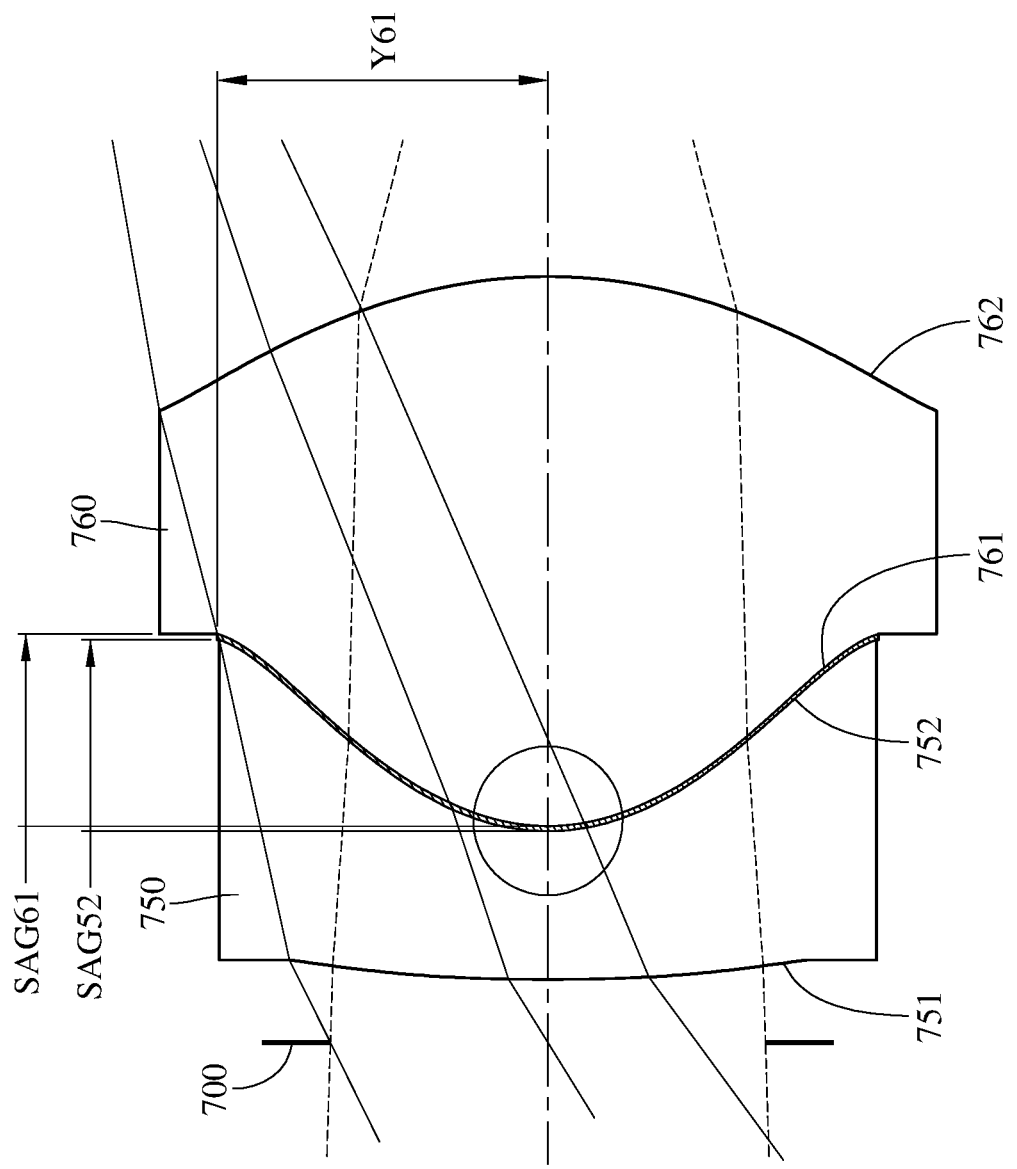
FIG. 16 shows a schematic view of SAG52, SAG61 and Y61 according to the 7th embodiment of the present disclosure.

When a maximum effective radius of the object-side surface of the sixth lens element is Y61, and a curvature radius of the object-side surface of the sixth lens element is R11, the following condition can be satisfied: $0.20<R11/Y61<0.97$. Therefore, it is favorable for correcting aberrations in both paraxial region and off-axis region of the object-side surface of the sixth lens element so as to reduce aberrations such as coma and distortion, thereby enhancing the image quality. Preferably, the following condition can also be satisfied: $0.30<R11/Y61<0.68$. Please refer to FIG. 16 which shows a schematic view of Y61 according to the 7th embodiment of the present disclosure.

Figure 17:
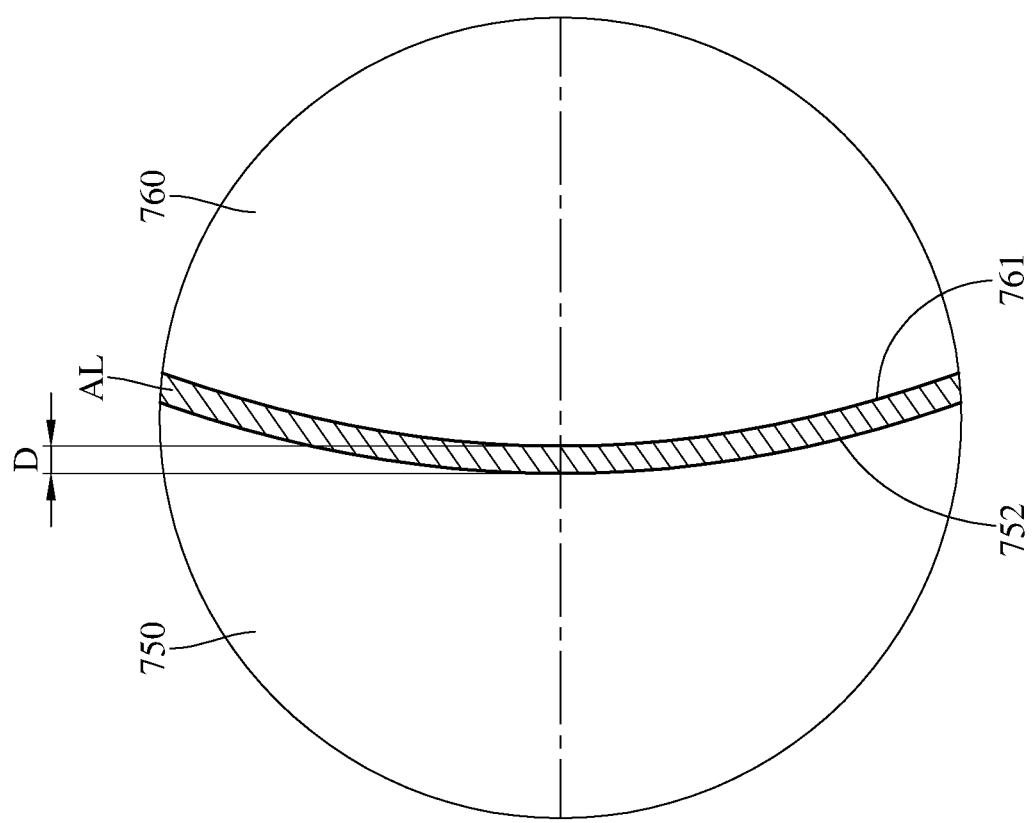
FIG. 17 shows a schematic view of a central thickness of an adhesive layer between the fifth lens element and the sixth lens element according to the 7th embodiment of the present disclosure.

According to the present disclosure, the fifth lens element and the sixth lens element can be cemented to each other. When the fifth lens element and the sixth lens element are cemented to each other, the incline angle on the periphery of the adhesive surface can be increased so as to control light from the large angle of view, thereby providing better ability in correcting images. Also, when a central thickness of an adhesive layer between the image-side surface of the fifth lens element and the object-side surface of the sixth lens element is D, the following condition can be satisfied: $0.01 [mm]<D<0.05 [mm]$. Therefore, it is favorable for properly attaching the fifth lens element to the sixth lens element with sufficient adhesives so as to improve image quality. Please refer to FIG. 17, which shows an adhesive layer AL between an image-side surface 752 of a fifth lens element 750 and an object-side surface 761 of a sixth lens element 760, and the central thickness D of the adhesive layer AL, according to the 7th embodiment of the present disclosure.

When the focal length of the first lens element is f1, the focal length of the second lens element is f2, and the focal length of the third lens element is f3, at least one of the following conditions can be satisfied: $|f3|<|f2|$; and $|f3|<|f1|$. Therefore, it is favorable for balancing refractive power on the object side of each lens element so as to control the total length of the photographing optical lens system with a wide angle of view. Preferably, the following conditions can also be satisfied simultaneously: $|f3|<|f2|$ and $|f3|<|f1|$.

When a curvature radius of the object-side surface of the fifth lens element is R9, and a curvature radius of the image-side surface of the fifth lens element is R10, the following condition can be satisfied: $0.70<(R9+R10)/(R9-R10)<1.80$. Therefore, it is favorable for controlling the shape of the fifth lens element so as to improve the light controlling ability of the fifth lens element on the image side when configured with the sixth lens element.

When the curvature radius of the object-side surface of the sixth lens element is R11, and a central thickness of the sixth lens element is CT6, the following condition can be satisfied: $0.10<R11/CT6<0.45$. Therefore, it is favorable for improving the thickness and the surface shape of the sixth lens element so as to provide the object-side surface of the sixth lens element with a sufficient light controlling ability to correct aberrations.

According to the present disclosure, an absolute value of the focal length of the first lens element can be the largest among all absolute values of focal lengths of the six lens elements. Therefore, it is favorable for allowing the first lens element to become a correction lens element so as to improve the image quality in the peripheral field of view.

When a displacement in parallel with an optical axis from an axial vertex of the image-side surface of the fifth lens element to a maximum effective radius position of the image-side surface of the fifth lens element is SAG52, a displacement in parallel with the optical axis from an axial vertex of the object-side surface of the sixth lens element to the maximum effective radius position of the object-side surface of the sixth lens element is SAG61, and the focal length of the photographing optical lens system is f, the following condition can be satisfied: $-0.10<(|SAG52|-|SAG61|)/f<0$. Therefore, it is favorable for reducing the back focal length of the photographing optical lens system so as to achieve compactness and flatten the Petzval surface. Please refer to FIG. 16, which shows a schematic view of SAG52 and SAG61 according to the 7th embodiment of the present disclosure. When the direction from the axial vertex of one surface to the maximum effective radius position of the same surface is facing towards the image side of the photographing optical lens system, the values of SAG52 and SAG61 are positive; when the direction from the axial vertex of the surface to the maximum effective radius position of the same surface is facing towards the object side of the photographing optical lens system, the values of SAG52 and SAG61 are negative.

When the focal length of the photographing optical lens system is f, and an entrance pupil diameter of the photographing optical lens system is EPD, the following condition can be satisfied: $1.0<f/EPD<3.50$. Therefore, it is favorable for adjusting the size of the entrance pupil so as to provide sufficient incident light for increasing image illuminance. Preferably, the following condition can also be satisfied: $1.0<f/EPD<2.50$.

When the axial distance between the object-side surface of the first lens element and the image surface is TL, and a maximum image height of the photographing optical lens system is ImgH, the following condition can be satisfied: $3.0<TL/ImgH<8.0$. Therefore, it is favorable for maintaining a sufficient light receiving area with the requirement of compactness, thereby providing sufficient image illuminance.

According to the present disclosure, the photographing optical lens system further includes an aperture stop. When an axial distance between the aperture stop and the image-side surface of the sixth lens element is SD, an axial distance between the object-side surface of the first lens element and the image-side surface of the sixth lens element is TD, the following condition can be satisfied: $0.15<SD/TD<0.45$. Therefore, it is favorable for obtaining the optimized position of the aperture stop so as to balance the size and the view angle of the photographing optical lens system.

When the focal length of the photographing optical lens system is f, and the maximum image height of the photographing optical lens system is ImgH, the following condition can be satisfied: $1.50<ImgH/f<3.50$. Therefore, it is favorable for obtaining a proper field of view so as to be applicable to more kinds of applications, such as applications in vehicles. Preferably, the following condition can also be satisfied: $1.50<ImgH/f<3.0$.

When an Abbe number of the first lens element is V1, an Abbe number of the second lens element is V2, an Abbe number of the third lens element is V3, the Abbe number of the fourth lens element is V4, the Abbe number of the fifth lens element is V5, an Abbe number of the sixth lens element is V6, and an Abbe number of the i-th lens element is Vi, at least two of the six lens elements satisfy the following condition: $10.0<Vi<25.0$, wherein i=1, 2, 3, 4, 5, 6. Therefore, it is favorable for obtaining a sufficient light controlling ability so as to control the convergence positions of light rays with different wavelengths, thereby avoiding image overlaps.

According to the present disclosure, the fifth lens element and the sixth lens element can be cemented to each other, and the two cementing surfaces of the fifth lens element and the sixth lens element (the image-side surface of the fifth lens element and the object-side surface of the sixth lens element) can be both aspheric. Therefore, it is favorable for controlling the position of the image surface to maintain the proper size of the photographing optical lens system while correcting aberrations in the off-axis region for improved image quality.

According to the present disclosure, the aforementioned features and conditions can be utilized in numerous combinations so as to achieve corresponding effects.

According to the present disclosure, the lens elements of the photographing optical lens system can be made of either glass or plastic material. When the lens elements are made of glass material, the refractive power distribution of the photographing optical lens system may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the photographing optical lens system can be effectively shortened. The aspheric surfaces may be formed by plastic injection molding or glass molding.

According to the present disclosure, an additive is optionally added in the lens element(s) to change the light transmittance of the lens element in specific wavelength of light rays so as to reduce scattered light and chromatic aberration. For example, the additive can filter light rays having the wavelength ranging from 600 nm to 800 nm so as to reduce unwanted red light or infrared light. Furthermore, the additive can filter light rays having the wavelength ranging from 350 nm to 450 nm so as to reduce unwanted blue light or UV light. Therefore, the additive can prevent light rays of specific wavelengths from negatively affecting the imaging quality. In addition, the additive can be uniformly distributed in mixtures of plastic material used for manufacturing the lens elements by the injection molding process.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the photographing optical lens system, based on the corresponding image sensor, can be flat or curved, especially a curved surface being concave facing towards the object side of the photographing optical lens system.

According to the present disclosure, an image correction unit, such as a field flattener, can be optionally disposed between the lens element closest to the image side of the photographing optical lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens system and thereby provides a wider field of view for the same.

According to the present disclosure, the photographing optical lens system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, an image capturing unit includes the aforementioned photographing optical lens system and an image sensor, wherein the image sensor is disposed on the image surface of the photographing optical lens system. In some embodiments, the image capturing unit can further include a barrel, a holder member or a combination thereof.

Figure 18:
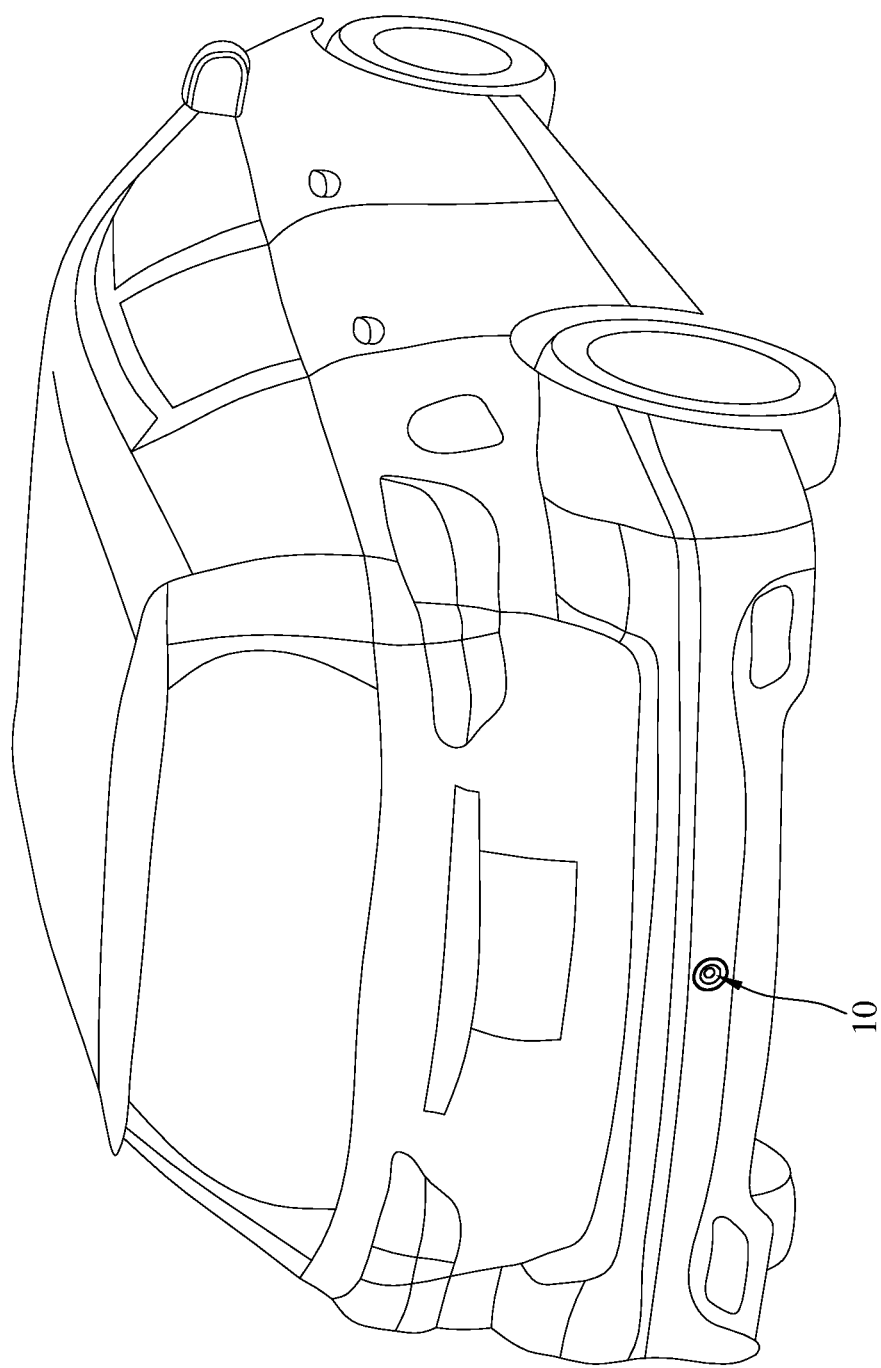
FIG. 18 shows an electronic device according to one embodiment.
Figure 19:
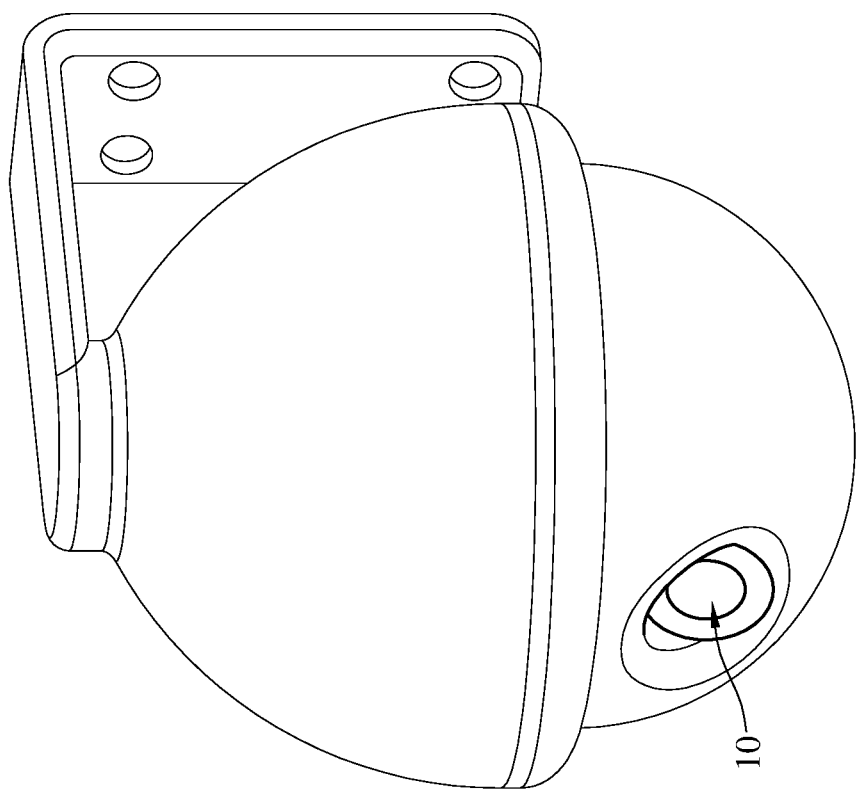
FIG. 19 shows an electronic device according to another embodiment.
Figure 20:
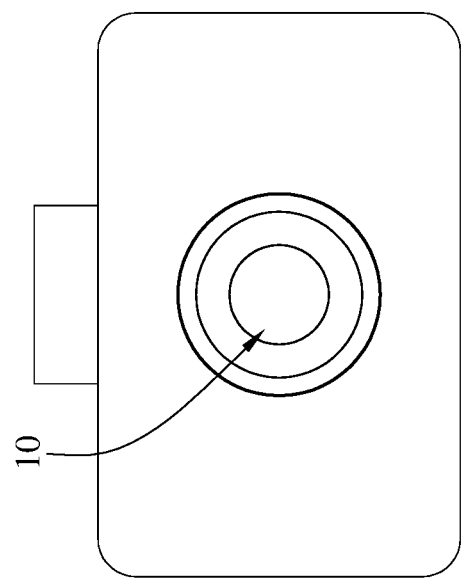
FIG. 20 shows an electronic device according to still another embodiment.

According to the present disclosure, the aforementioned image capturing unit may be installed in, but not limited to, an electronic device. Please refer to FIG. 18, FIG. 19 and FIG. 20, an image capturing unit 10 can be applied to electronic devices, such as a vehicle backup camera (FIG. 18), a network surveillance device (FIG. 19) or a dashboard camera (FIG. 20). In some embodiments, the electronic device can further include, but not limited to, a control unit, a display unit, a storage unit, a random access memory unit (RAM), a read only memory unit (ROM) or a combination thereof.

According to the present disclosure, the photographing optical lens system can be optionally applied to optical systems with a movable focus. Furthermore, the photographing optical lens system features good capability in aberration corrections and high image quality, and can be applied to 3D (three-dimensional) image capturing applications, in products, such as advanced driver assistance systems (ADAS), lane departure warning systems (LDWS), blind spot detection systems, multiple lens devices, smart phones, smart televisions, digital cameras, drones, sport cameras, mobile devices, digital tablets, network surveillance devices, motion sensing input devices, wearable devices and other electronic imaging devices. The aforementioned electronic devices are only exemplary for showing the image capturing unit of the present disclosure installed in an electronic device and are not limited thereto.

According to the above description of the present disclosure, the following specific embodiments are provided for further explanation.

1st Embodiment

Figure 1:
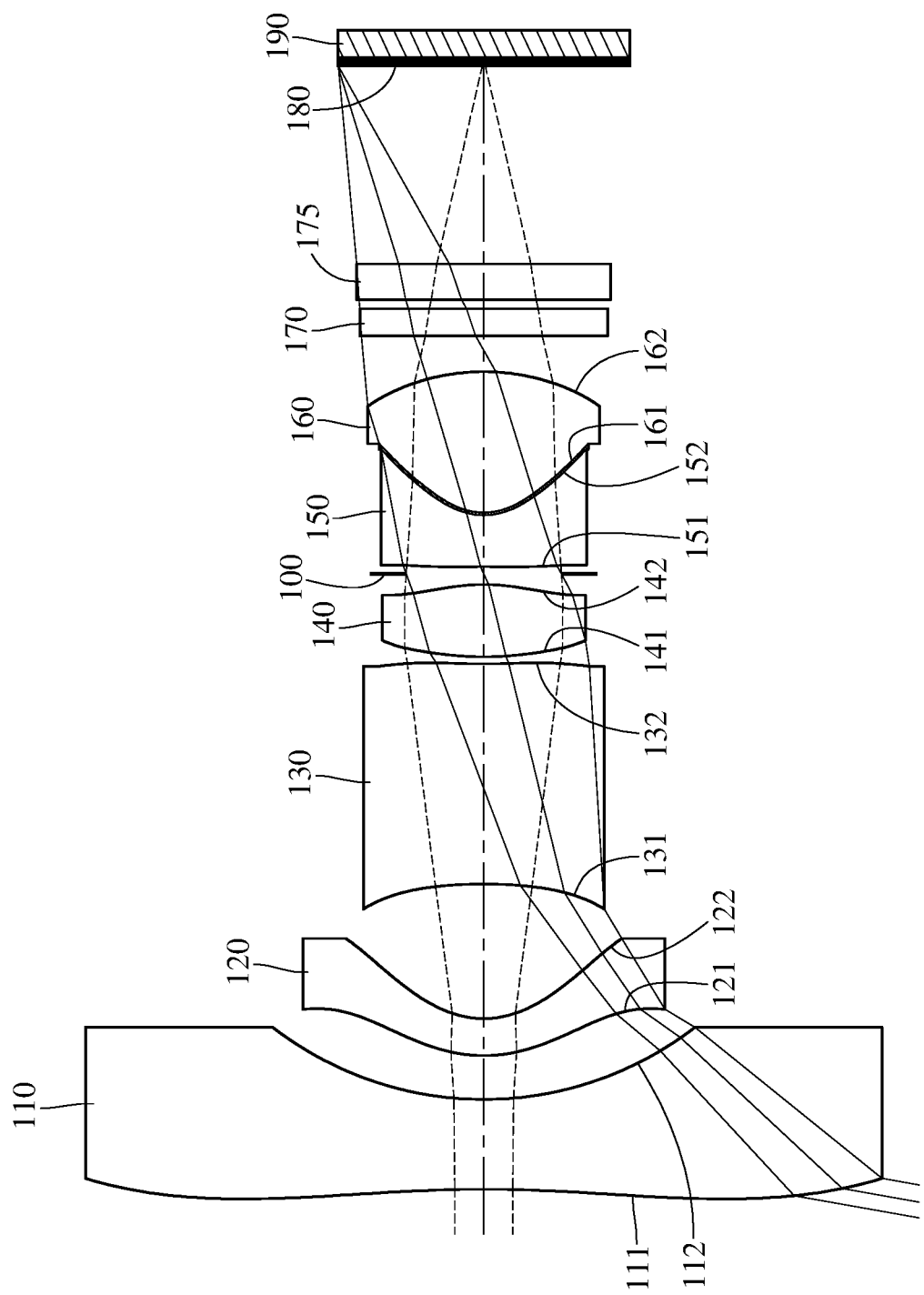
FIG. 1 is a schematic view of an image capturing unit according to the 1st embodiment of the present disclosure.
Figure 2:
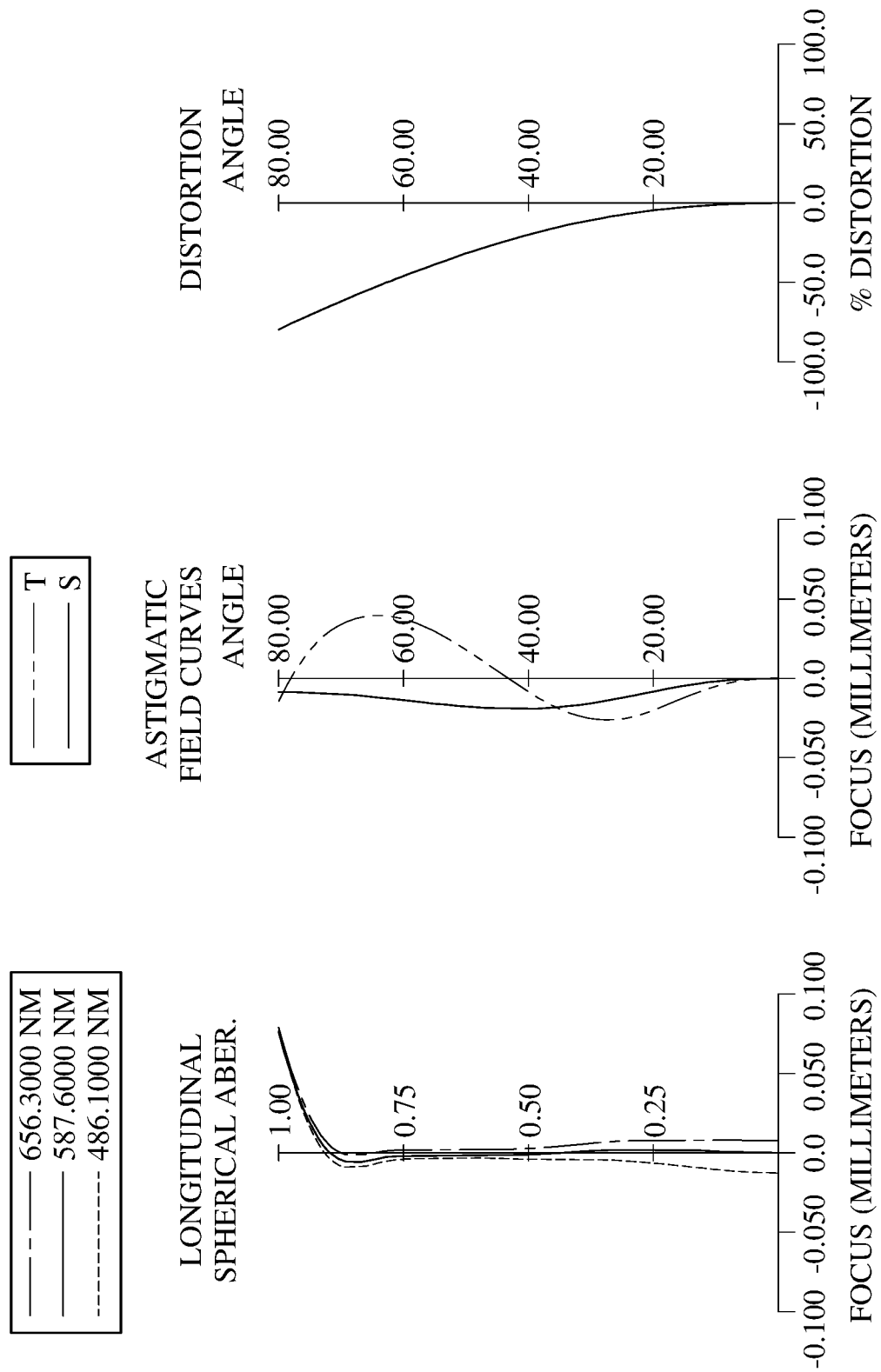
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens system (its reference numeral is omitted) of the present disclosure and an image sensor 190. The photographing optical lens system includes, in order from an object side to an image side, a first lens element 110, a second lens element 120, a third lens element 130, a fourth lens element 140, an aperture stop 100, a fifth lens element 150, a sixth lens element 160, a filter 170, a cover glass 175 and an image surface 180. The photographing optical lens system includes six lens elements (110, 120, 130, 140, 150 and 160) with no additional lens element disposed between each of the adjacent six lens elements.

The first lens element 110 with negative refractive power has an object-side surface 111 being concave in a paraxial region thereof and an image-side surface 112 being concave in a paraxial region thereof. The first lens element 110 is made of glass material and has the object-side surface 111 being aspheric and the image-side surface 112 being spherical.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has an inflection point.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 and the image-side surface 152 of the fifth lens element 150 are cemented to each other.

The filter 170 and the cover glass 175 are made of glass material and located between the sixth lens element 160 and the image surface 180, and will not affect the focal length of the photographing optical lens system. The image sensor 190 is disposed on or near the image surface 180 of the photographing optical lens system.

The equation of the aspheric surface profiles of the aforementioned lens elements of the 1st embodiment is expressed as follows:

$$X(Y) = (Y^2/R)/\left(1 + \text{sqrt}\left(1 - (1+k) \times (Y/R)^2\right)\right) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens system of the image capturing unit according to the 1st embodiment, when a focal length of the photographing optical lens system is f, an f-number of the photographing optical lens system is Fno, and half of a maximum field of view of the photographing optical lens system is HFOV, these parameters have the following values: f=1.42 millimeters (mm), Fno=2.20, HFOV=80.0 degrees (deg.).

When an Abbe number of the fourth lens element 140 is V4, and an Abbe number of the fifth lens element 150 is V5, the following condition is satisfied: V4+V5=45.0.

When an axial distance between the first lens element 110 and the second lens element 120 is T12, and an axial distance between the second lens element 120 and the third lens element 130 is T23, the following condition is satisfied: T23/T12=3.08.

When an axial distance between the third lens element 130 and the fourth lens element 140 is T34, an axial distance between the fifth lens element 150 and the sixth lens element 160 is T56, the following condition is satisfied: T34/T56=2.63.

When a curvature radius of the object-side surface 161 of the sixth lens element 160 is R11, and a central thickness of the sixth lens element 160 is CT6, the following condition is satisfied: R11/CT6=0.44.

When the curvature radius of the object-side surface 161 of the sixth lens element 160 is R11, and a maximum effective radius of the object-side surface 161 of the sixth lens element 160 is Y61, the following condition is satisfied: R11/Y61=0.59.

When a curvature radius of the image-side surface 112 of the first lens element 110 is R2, and a curvature radius of the image-side surface 122 of the second lens element 120 is R4, the following condition is satisfied: R2/R4=3.69.

When a curvature radius of the object-side surface 131 of the third lens element 130 is R5, and a curvature radius of the image-side surface 132 of the third lens element 130 is R6, the following condition is satisfied: (R5+R6)/(R5−R6)=−0.06.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=0.22.

When a curvature radius of the object-side surface 151 of the fifth lens element 150 is R9, a curvature radius of the image-side surface 152 of the fifth lens element 150 is R10, the following condition is satisfied: (R9+R10)/(R9-R10)=0.91.

When the focal length of the photographing optical lens system is f, and a focal length of the second lens element 120 is f2, the following condition is satisfied: f/f2=−0.20.

When the focal length of the photographing optical lens system is f, and a focal length of the fourth lens element 140 is f4, the following condition is satisfied: f/f4=0.69.

When a focal length of the third lens element 130 is f3, and the focal length of the fourth lens element 140 is f4, the following condition is satisfied: f3/f4=−2.51.

When a focal length of the first lens element 110 is f1, the focal length of the second lens element 120 is f2, and the focal length of the third lens element 130 is f3, the following condition is satisfied: (|f2|+|f3|)/|f1|=2.50.

When a displacement in parallel with an optical axis from an axial vertex of the image-side surface 152 of the fifth lens element 150 to a maximum effective radius position of the image-side surface 152 of the fifth lens element 150 is SAG52, a displacement in parallel with the optical axis from an axial vertex of the object-side surface 161 of the sixth lens element 160 to the maximum effective radius position of the object-side surface 161 of the sixth lens element 160 is SAG61, and the focal length of the photographing optical lens system is f, the following condition is satisfied: (|SAG52|−|SAG61|)/f=−0.0205.

When a central thickness of an adhesive layer between the image-side surface 152 of the fifth lens element 150 and the object-side surface 161 of the sixth lens element 160 is D, the following condition is satisfied: D=0.03 [mm].

When the focal length of the photographing optical lens system is f, and an entrance pupil diameter of the photographing optical lens system is EPD, the following condition is satisfied: f/EPD=2.20.

When the focal length of the photographing optical lens system is f, and an axial distance between the object-side surface 111 of the first lens element 110 and the image surface 180 is TL, the following condition is satisfied: f/TL=0.11.

When a maximum image height of the photographing optical lens system is ImgH, and the focal length of the photographing optical lens system is f, the following condition is satisfied: ImgH/f=1.14.

When the axial distance between the object-side surface 111 of the first lens element 110 and the image surface 180 is TL, and the maximum image height of the photographing optical lens system is ImgH, the following condition is satisfied: TL/ImgH=7.70.

When an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.25.

When the focal length of the second lens element 120 is f2, and the focal length of the third lens element 130 is f3, the following condition is satisfied: |f3|<|f2|. In detail, the absolute value of the focal length of the second lens element 120 is 7.10, and the absolute value of the focal length of the third lens element 130 is 5.17.

When an Abbe number of the first lens element 110 is V1, an Abbe number of the second lens element 120 is V2, an Abbe number of the third lens element 130 is V3, the Abbe number of the fourth lens element 140 is V4, the Abbe number of the fifth lens element 150 is V5, an Abbe number of the sixth lens element 160 is V6, and an Abbe number of the i-th lens element is Vi, two of the six lens elements satisfy the following condition: 10.0<Vi<25.0, wherein i=1, 2, 3, 4, 5, 6. In this embodiment, the Abbe numbers of the fourth lens element 140 and the fifth lens element 150 fall between 10.0 and 25.0. In detail, the Abbe number of the fourth lens element 140 is 21.5, and the Abbe number of the fifth lens element 150 is 23.5.

The detailed optical data of the 1st embodiment are shown in Table 1 and the aspheric surface data are shown in Table 2 below.

TABLE 1

1st Embodiment
f = 1.42 mm, Fno = 2.20, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −14.215 | (ASP) | 1.000 | Glass | 1.603 | 60.7 | −4.90 |
| 2 | | 3.831 | | 0.487 | | | | |
| 3 | Lens 2 | 1.632 | (ASP) | 0.412 | Plastic | 1.530 | 55.8 | −7.10 |
| 4 | | 1.039 | (ASP) | 1.498 | | | | |
| 5 | Lens 3 | −5.526 | (ASP) | 2.450 | Plastic | 1.530 | 55.8 | −5.17 |
| 6 | | 6.279 | (ASP) | 0.079 | | | | |
| 7 | Lens 4 | 3.253 | (ASP) | 0.805 | Plastic | 1.650 | 21.5 | 2.06 |
| 8 | | −2.059 | (ASP) | 0.117 | | | | |
| 9 | Ape. Stop | Plano | | 0.081 | | | | |
| 10 | Lens 5 | −16.004 | (ASP) | 0.573 | Plastic | 1.639 | 23.5 | −1.05 |
| 11 | | 0.712 | (ASP) | 0.030 | Cemented | 1.485 | 53.2 | |
| 12 | Lens 6 | 0.692 | (ASP) | 1.568 | Plastic | 1.544 | 55.9 | 1.20 |
| 13 | | −2.383 | (ASP) | 0.400 | | | | |
| 14 | Filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 2.202 | | | | |
| 18 | Image | Plano | | — | | | | |

Note:
Reference wavelength is 587.6 nm (d-line).

TABLE 2

Aspheric Coefficients

| | Surface # | | | | | |
|---|---|---|---|---|---|---|
| | 1 | 3 | 4 | 5 | 6 | 7 |
| k = | −5.0000E+01 | −2.8628E+00 | −1.0416E+00 | 9.4264E+00 | −1.2207E+01 | −1.8169E+01 |
| A4 = | 1.8190E−03 | 3.0518E−02 | −1.5131E−03 | −2.5529E−02 | −1.4399E−01 | −1.5670E−02 |
| A6 = | −3.9034E−05 | −2.8580E−02 | −2.8330E−02 | 2.0491E−03 | 7.7710E−02 | 2.6815E−02 |

TABLE 2-continued

| Aspheric Coefficients | | | | | |
|---|---|---|---|---|---|
| A8 = | 9.7300E−07 | 5.1734E−03 | 8.7198E−03 | −1.4298E−03 | −1.6386E−02 | 4.3313E−03 |
| A10 = | −7.6171E−09 | −2.9136E−04 | −1.4923E−03 | 3.2538E−04 | 3.5368E−04 | — |

| | Surface # | | | | |
|---|---|---|---|---|---|
| | 8 | 10 | 11 | 12 | 13 |
| k = | 1.9622E+00 | 3.8131E+01 | −8.7231E−01 | −1.6125E+00 | −4.8563E+00 |
| A4 = | 2.5742E−01 | 1.8154E−01 | −1.0208E−01 | 2.5037E−01 | −4.0950E−02 |
| A6 = | −1.9768E−01 | −2.7882E−01 | −2.7742E−01 | −6.4336E−01 | 9.1235E−03 |
| A8 = | 2.1846E−01 | 2.5794E−01 | 3.2626E−01 | 6.0065E−01 | −3.4853E−03 |
| A10 = | −1.2932E−01 | −1.0579E−01 | −1.1291E−01 | −1.8760E−01 | −3.5918E−04 |
| A12 = | 4.8018E−02 | — | — | — | — |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
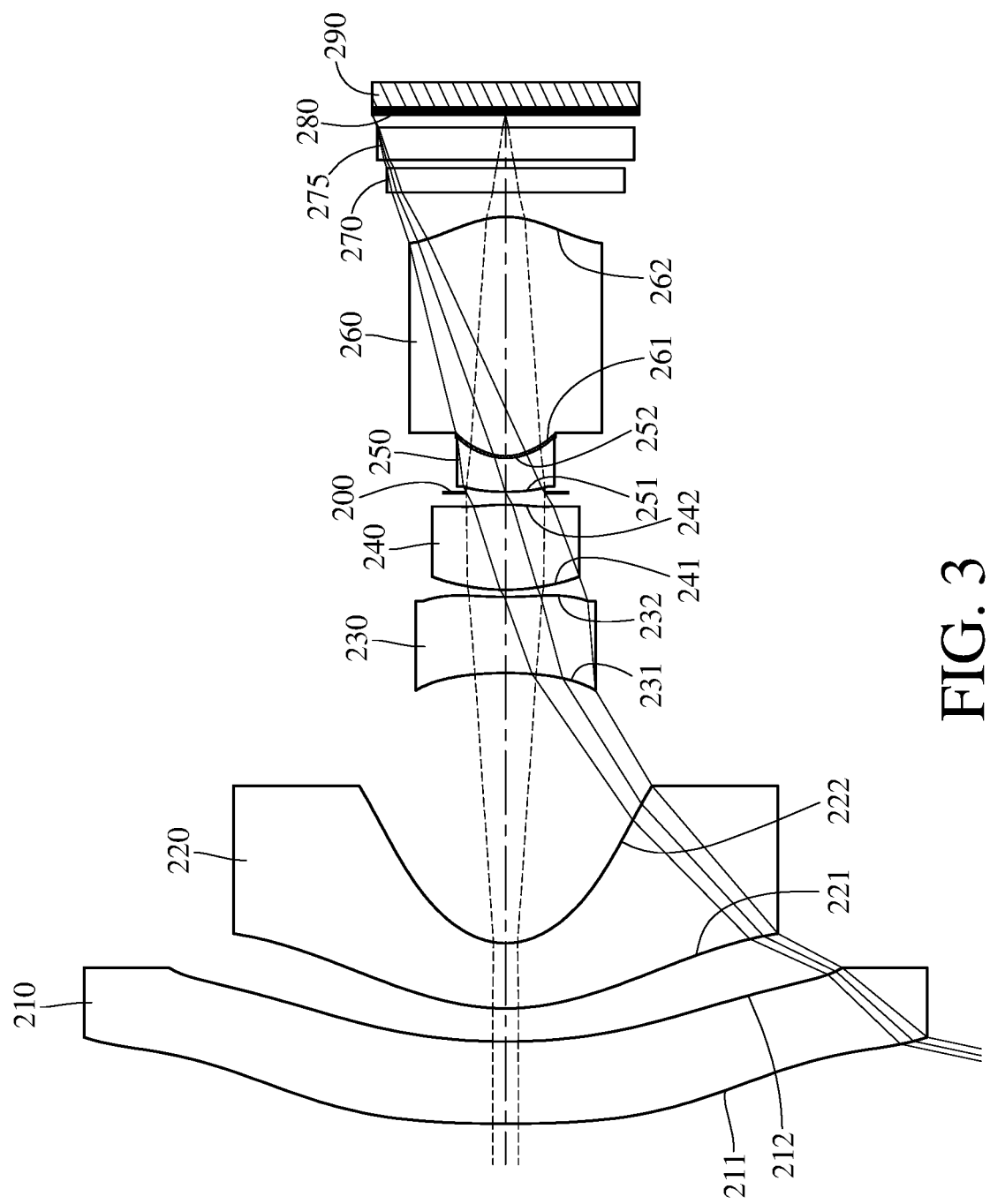
FIG. 3 is a schematic view of an image capturing unit according to the 2nd embodiment of the present disclosure.
Figure 4:
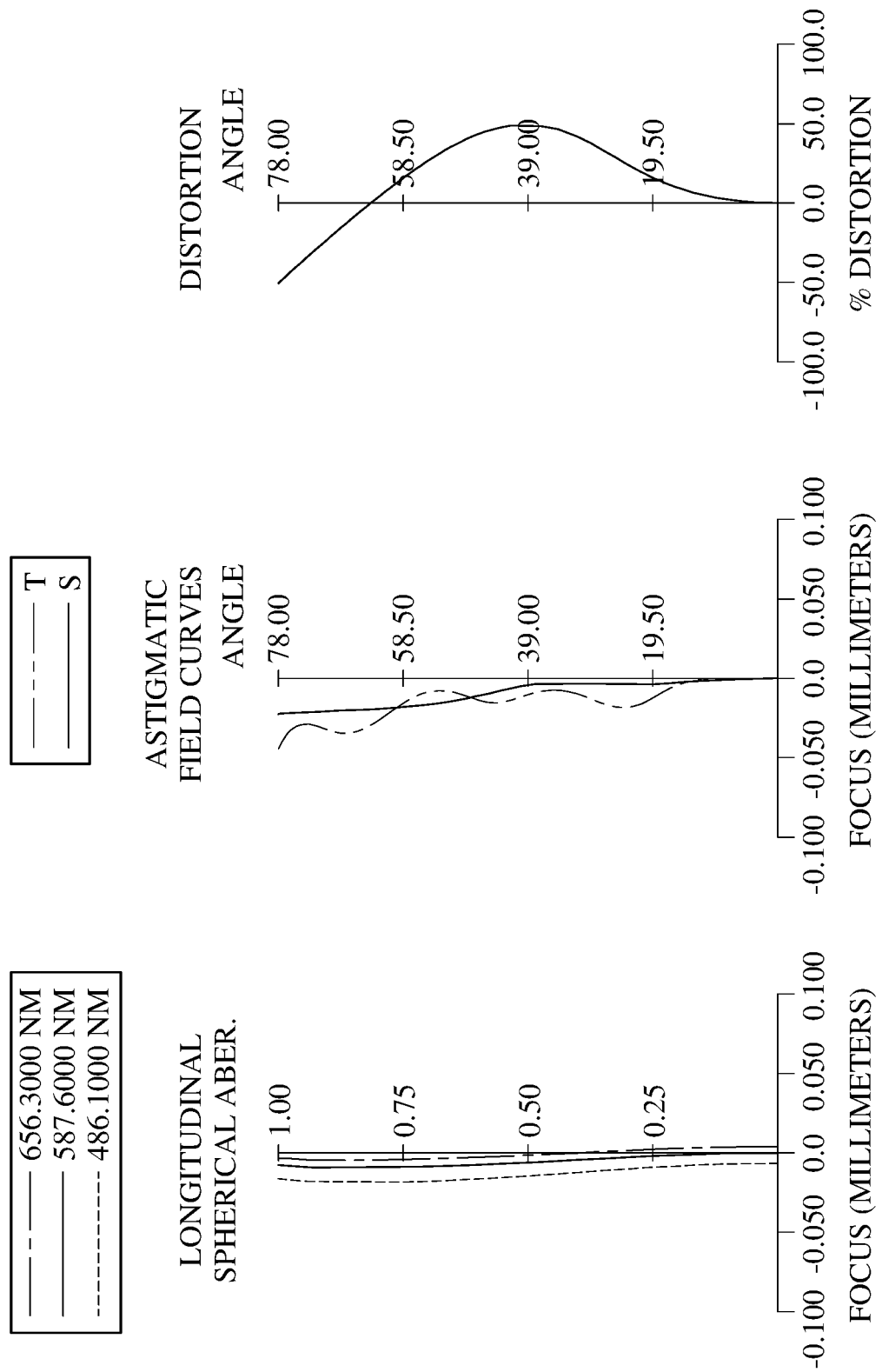
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens system (its reference numeral is omitted) of the present disclosure and an image sensor 290. The photographing optical lens system includes, in order from an object side to an image side, a first lens element 210, a second lens element 220, a third lens element 230, a fourth lens element 240, an aperture stop 200, a fifth lens element 250, a sixth lens element 260, a filter 270, a cover glass 275 and an image surface 280. The photographing optical lens system includes six lens elements (210, 220, 230, 240, 250 and 260) with no additional lens element disposed between each of the adjacent six lens elements.

The first lens element 210 with negative refractive power has an object-side surface 211 being convex in a paraxial region thereof and an image-side surface 212 being concave in a paraxial region thereof. The first lens element 210 is made of glass material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has an inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 and the image-side surface 252 of the fifth lens element 250 are cemented to each other.

The filter 270 and the cover glass 275 are made of glass material and located between the sixth lens element 260 and the image surface 280, and will not affect the focal length of the photographing optical lens system. The image sensor 290 is disposed on or near the image surface 280 of the photographing optical lens system.

In this embodiment, the absolute value of a focal length of the first lens element 210 is the largest among the absolute values of focal lengths of the six lens elements (the first lens element 210, the second lens element 220, the third lens element 230, the fourth lens element 240, the fifth lens element 250 and the sixth lens element 260). In detail, the absolute value of the focal length of the first lens element 210 is 20.21. In addition, when the focal length of the first lens element 210 is f1, and the focal length of the third lens element 230 is f3, the following condition is satisfied: |f3|<|f1|. The absolute value of the focal length of the third lens element 230 is 3.08.

In this embodiment, there are two lens elements having Abbe numbers between 10.0 and 25.0. In detail, the Abbe number of the fourth lens element 240 is 21.5, and the Abbe number of the fifth lens element 250 is 19.4.

The detailed optical data of the 2nd embodiment are shown in Table 3 and the aspheric surface data are shown in Table 4 below.

TABLE 3

2nd Embodiment
f = 0.71 mm, Fno = 2.22, HFOV = 78.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 20.992 | (ASP) | 1.010 | Glass | 1.603 | 60.7 | −20.21 |
| 2 | | 7.572 | (ASP) | 0.408 | | | | |
| 3 | Lens 2 | 2.908 | (ASP) | 0.802 | Plastic | 1.530 | 55.8 | −2.74 |
| 4 | | 0.876 | (ASP) | 3.325 | | | | |
| 5 | Lens 3 | −4.249 | (ASP) | 0.935 | Plastic | 1.530 | 55.8 | −3.80 |
| 6 | | 4.135 | (ASP) | 0.088 | | | | |
| 7 | Lens 4 | 2.404 | (ASP) | 1.047 | Plastic | 1.650 | 21.5 | 2.02 |
| 8 | | −2.396 | (ASP) | 0.149 | | | | |
| 9 | Ape. Stop | Plano | | 0.010 | | | | |
| 10 | Lens 5 | 3.581 | (ASP) | 0.412 | Plastic | 1.669 | 19.4 | −1.43 |
| 11 | | 0.719 | (ASP) | 0.030 | Cemented | 1.485 | 53.2 | |
| 12 | Lens 6 | 0.585 | (ASP) | 2.940 | Plastic | 1.544 | 55.9 | 1.87 |
| 13 | | −1.059 | (ASP) | 0.300 | | | | |
| 14 | Filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 0.151 | | | | |
| 18 | Image | Plano | | — | | | | |

Note:
Reference wavelength is 587.6 nm (d-line).

TABLE 4

Aspheric Coefficients

| | Surface # | | | | | |
|---|---|---|---|---|---|---|
| | 1 | 2 | 3 | 4 | 5 | 6 |
| k = | 1.0772E+01 | 2.0539E+00 | −1.5884E+00 | −9.1235E−01 | 8.7447E+00 | −9.9000E+01 |
| A4 = | 8.1502E−03 | 2.8210E−03 | −9.0289E−03 | −1.8929E−02 | −8.3548E−03 | −7.8925E−02 |
| A6 = | −6.4687E−04 | −7.8739E−04 | 4.3437E−04 | 3.8328E−02 | −4.1704E−03 | −1.0988E−01 |
| A8 = | 1.5937E−05 | 4.3054E−05 | −1.8229E−05 | −1.5690E−02 | −1.8658E−02 | 1.0334E−01 |
| A10 = | −5.5350E−08 | −9.5830E−07 | 4.5414E−07 | 1.4004E−03 | 1.0300E−02 | −2.8802E−02 |
| A12 = | −1.6985E−09 | — | — | — | — | — |

| | Surface # | | | | | |
|---|---|---|---|---|---|---|
| | 7 | 8 | 10 | 11 | 12 | 13 |
| k = | −1.9491E+01 | −8.6809E+00 | 2.5863E+01 | −5.4853E−01 | −1.6199E+00 | −3.5890E+00 |
| A4 = | 7.4426E−02 | 4.5273E−01 | 4.2463E−01 | −3.4880E−01 | −6.2951E−01 | 2.5691E−02 |
| A6 = | −1.3515E−02 | −5.3492E−01 | −9.0549E−01 | 5.5311E−01 | 2.3002E+00 | 4.2113E−02 |
| A8 = | 7.3414E−03 | 1.3573E+00 | 1.7149E+00 | 9.1233E−01 | −1.5378E+00 | −2.8952E−02 |
| A10 = | — | −1.8142E+00 | −2.3450E+00 | −1.2407E+00 | 2.2341E−01 | 9.9568E−03 |
| A12 = | — | 9.1796E−01 | — | — | — | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 0.71 | f/f2 | −0.26 |
| Fno | 2.22 | f/f4 | 0.35 |
| HFOV [deg.] | 78.0 | f3/f4 | −1.88 |
| V4 + V5 | 40.9 | (|f2| + |f3|)/|f1| | 0.32 |
| T23/T12 | 8.15 | (|SAG52| − |SAG61|)/f | −0.0391 |
| T34/T56 | 2.93 | D [mm] | 0.03 |
| R11/CT6 | 0.20 | f/EPD | 2.22 |
| R11/Y61 | 0.95 | f/TL | 0.06 |
| R2/R4 | 8.64 | ImgH/f | 2.31 |
| (R5 + R6)/(R5 − R6) | 0.01 | TL/ImgH | 7.59 |
| (R7 + R8)/(R7 − R8) | 0.00 | SD/TD | 0.30 |
| (R9 + R10)/(R9 − R10) | 1.50 | — | — |

3rd Embodiment

Figure 5:
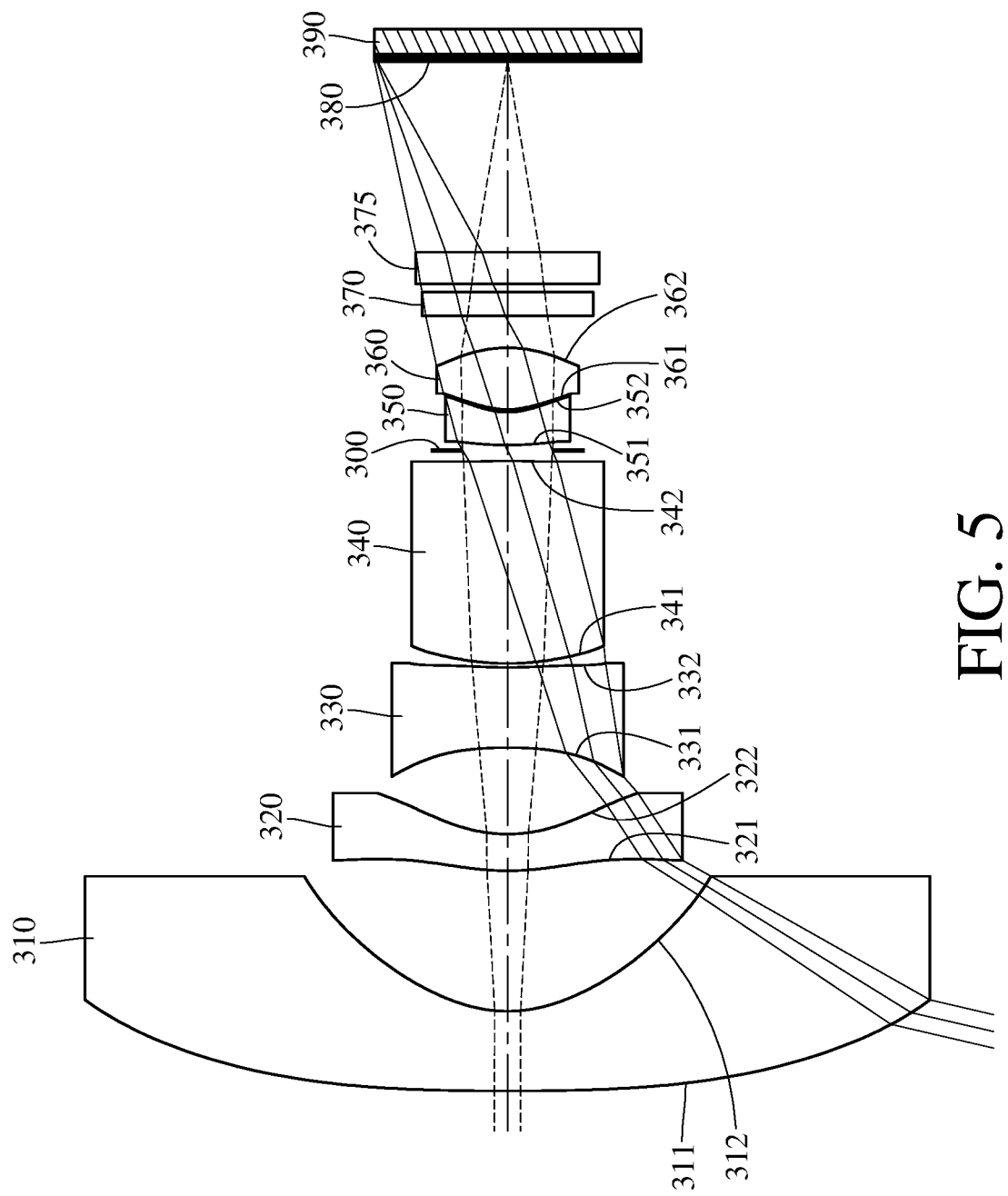
FIG. 5 is a schematic view of an image capturing unit according to the 3rd embodiment of the present disclosure.

FIG. 5 is a schematic view of an image capturing unit according to the 3rd embodiment of the present disclosure.

Figure 6:
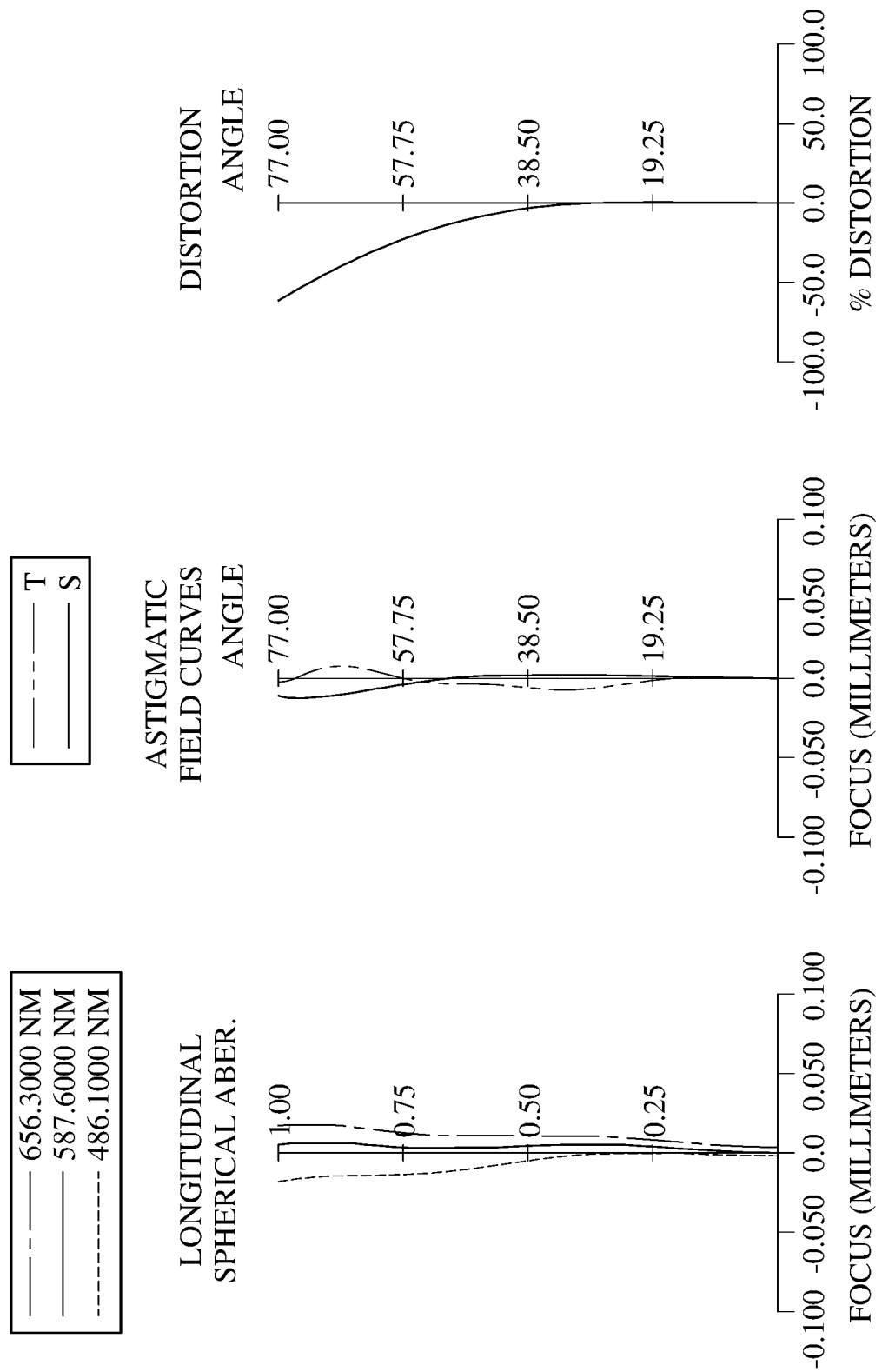
FIG. 6 shows spherical aberration curves, astigmatic field curves and a distortion curve of the image capturing unit according to the 3rd embodiment.

FIG. 6 shows, in order from left to right, spherical aberration curves, astigmatic field curves and a distortion curve of the image capturing unit according to the 3rd embodiment. In FIG. 5, the image capturing unit includes the photographing optical lens system (its reference numeral is omitted) of the present disclosure and an image sensor 390. The photographing optical lens system includes, in order from an object side to an image side, a first lens element 310, a second lens element 320, a third lens element 330, a fourth lens element 340, an aperture stop 300, a fifth lens element 350, a sixth lens element 360, a filter 370, a cover glass 375 and an image surface 380. The photographing optical lens system includes six lens elements (310, 320, 330, 340, 350 and 360) with no additional lens element disposed between each of the adjacent six lens elements.

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has two inflection points.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric.

The filter 370 and the cover glass 375 are made of glass material and located between the sixth lens element 360 and the image surface 380, and will not affect the focal length of the photographing optical lens system. The image sensor 390 is disposed on or near the image surface 380 of the photographing optical lens system.

In this embodiment, there are two lens elements having Abbe numbers between 10.0 and 25.0. In detail, the Abbe number of the fourth lens element 340 is 21.5, and the Abbe number of the fifth lens element 350 is 23.5.

When a focal length of the second lens element 320 is f2, and a focal length of the third lens element 330 is f3, the following condition is satisfied: |f3|<|f2|. In detail, the absolute value of the focal length of the second lens element 320 is 9.27, and the absolute value of the focal length of the third lens element 330 is 5.12.

The detailed optical data of the 3rd embodiment are shown in Table 5 and the aspheric surface data are shown in Table 6 below.

TABLE 5

3rd Embodiment
f = 0.99 mm, Fno = 3.00, HFOV = 77.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 38.979 | (ASP) | 1.000 | Glass | 1.603 | 60.6 | −3.05 |
| 2 | | 1.738 | (ASP) | 1.761 | | | | |
| 3 | Lens 2 | 3.150 | (ASP) | 0.459 | Plastic | 1.530 | 55.8 | −9.27 |
| 4 | | 1.823 | (ASP) | 1.084 | | | | |
| 5 | Lens 3 | −5.030 | (ASP) | 1.005 | Plastic | 1.530 | 55.8 | −5.12 |
| 6 | | 6.306 | (ASP) | 0.050 | | | | |
| 7 | Lens 4 | 3.163 | (ASP) | 2.538 | Plastic | 1.650 | 21.5 | 3.70 |
| 8 | | −6.907 | (ASP) | 0.130 | | | | |
| 9 | Ape. Stop | Plano | | 0.068 | | | | |
| 10 | Lens 5 | 3.679 | (ASP) | 0.412 | Plastic | 1.639 | 23.5 | −1.87 |
| 11 | | 0.863 | (ASP) | 0.035 | | | | |
| 12 | Lens 6 | 1.019 | (ASP) | 0.773 | Plastic | 1.544 | 55.9 | 1.27 |
| 13 | | −1.575 | (ASP) | 0.400 | | | | |
| 14 | Filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 2.383 | | | | |
| 18 | Image | Plano | | — | | | | |

Note:
Reference wavelength is 587.6 nm (d-line).

TABLE 6

Aspheric Coefficients

| Surface # | | | | | |
|---|---|---|---|---|---|
| 1 | 2 | 3 | 4 | 5 | 6 |
| k = 4.2720E+01 | −6.3709E−01 | −5.2451E+00 | −8.3566E−01 | 7.2364E+00 | 1.9097E+01 |
| A4 = 1.6145E−03 | −3.1654E−02 | −4.6947E−02 | −1.9324E−01 | −3.2151E−02 | −9.9796E−02 |
| A6 = −5.4371E−05 | 4.7350E−03 | 9.2390E−03 | −6.1680E−03 | −1.3972E−02 | 4.5056E−02 |
| A8 = 1.0635E−06 | −5.9535E−04 | −8.4446E−04 | −1.4037E−03 | 1.2748E−02 | −1.4493E−02 |
| A10 = −4.6237E−09 | 2.1589E−05 | 3.2471E−05 | 6.1576E−04 | −1.7158E−03 | 5.1080E−03 |

| Surface # | | | | | |
|---|---|---|---|---|---|
| 7 | 8 | 10 | 11 | 12 | 13 |
| k = −2.1527E+01 | 3.2716E+01 | −6.2896E+00 | −1.1389E+00 | −2.7151E+00 | −4.8487E+00 |
| A4 = 4.2916E−02 | 1.6649E−01 | −8.4422E−02 | −7.4439E−01 | −3.6456E−01 | −1.2599E−01 |
| A6 = −2.8602E−02 | −1.5220E−01 | 1.3104E−01 | 1.1116E+00 | 5.8460E−01 | 1.1876E−01 |
| A8 = 1.4847E−02 | 4.8511E−01 | −5.7844E−02 | −1.0305E+00 | −3.8792E−01 | −1.0971E−01 |
| A10 = — | −8.5918E−01 | −1.1821E−02 | 3.0027E−01 | 3.0108E−02 | 1.2074E−01 |
| A12 = — | 8.0742E−01 | — | — | — | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.99 | f/f2 | −0.11 |
| Fno | 3.00 | f/f4 | 0.27 |
| HFOV [deg.] | 77.0 | f3/f4 | −1.38 |
| V4 + V5 | 45.0 | (|f2| + |f3|)/|f1| | 4.72 |
| T23/T12 | 0.62 | (|SAG52| − |SAG61|)/f | −0.0004 |
| T34/T56 | 1.43 | D [mm] | 0.03 |
| R11/CT6 | 1.32 | f/EPD | 3.00 |
| R11/Y61 | 1.27 | f/TL | 0.08 |
| R2/R4 | 0.95 | ImgH/f | 1.66 |
| (R5 + R6)/(R5 − R6) | −0.11 | TL/ImgH | 7.89 |
| (R7 + R8)/(R7 − R8) | −0.37 | SD/TD | 0.14 |
| (R9 + R10)/(R9 − R10) | 1.61 | — | — |

4th Embodiment

Figure 7:
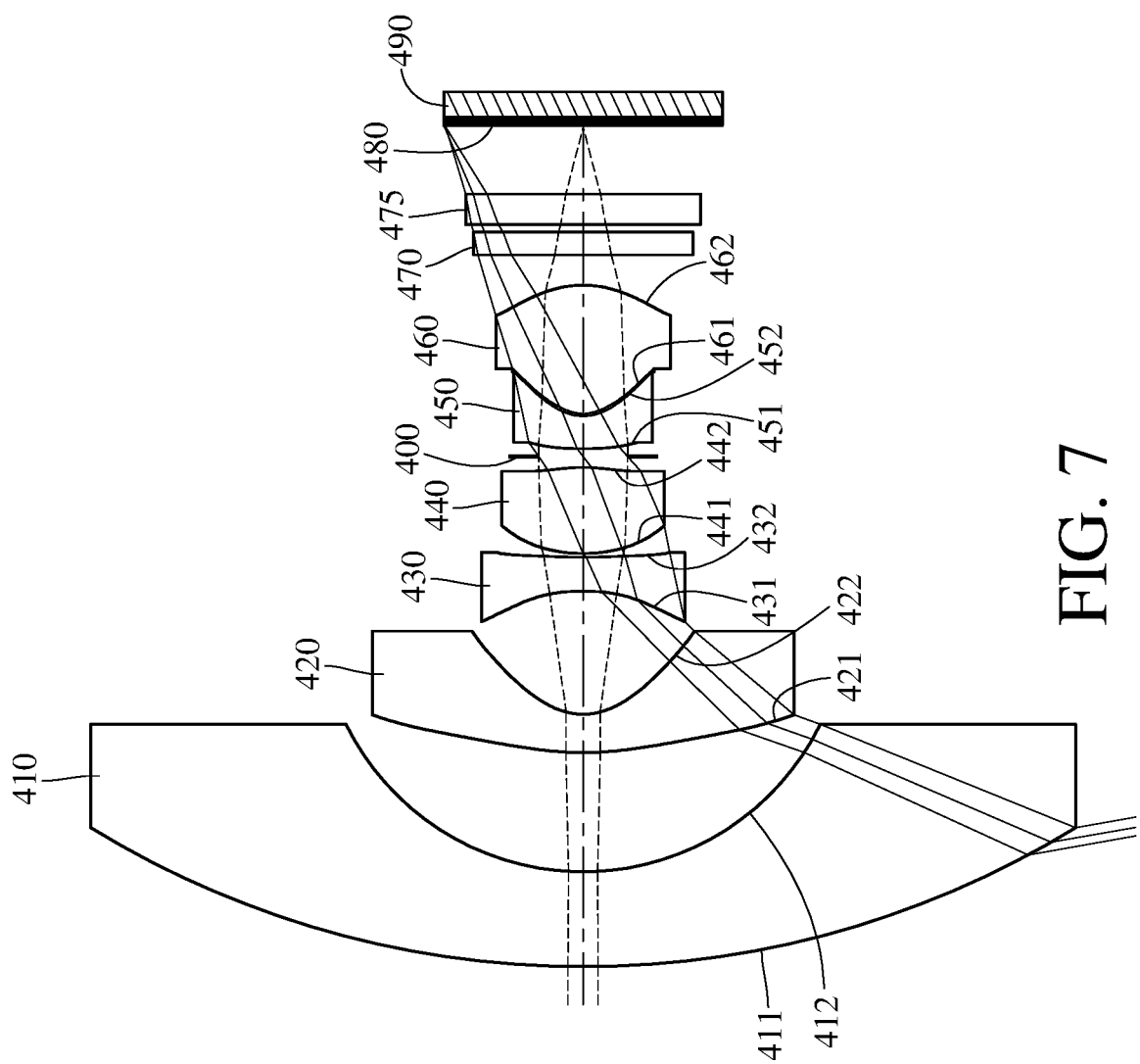
FIG. 7 is a schematic view of an image capturing unit according to the 4th embodiment of the present disclosure.
Figure 8:
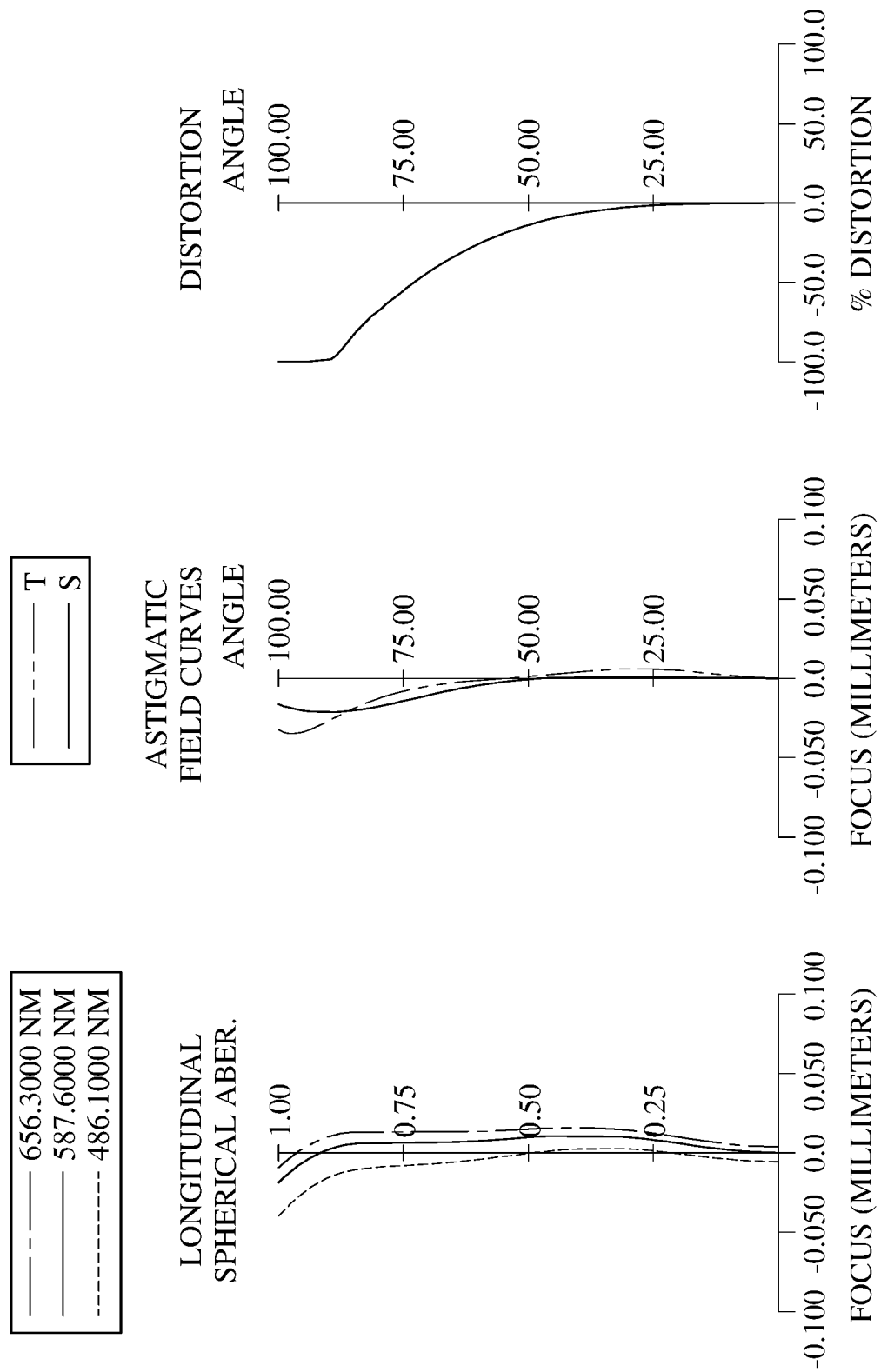
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens system (its reference numeral is omitted) of the present disclosure and an image sensor 490. The photographing optical lens system includes, in order from an object side to an image side, a first lens element 410, a second lens element 420, a third lens element 430, a fourth lens element 440, an aperture stop 400, a fifth lens element 450, a sixth lens element 460, a filter 470, a cover glass 475 and an image surface 480. The photographing optical lens system includes six lens elements (410, 420, 430, 440, 450 and 460) with no additional lens element disposed between each of the adjacent six lens elements.

The first lens element 410 with negative refractive power has an object-side surface 411 being convex in a paraxial region thereof and an image-side surface 412 being concave in a paraxial region thereof. The first lens element 410 is made of glass material and has the object-side surface 411 and the image-side surface 412 being both spherical.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has two inflection points.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 and the image-side surface 452 of the fifth lens element 450 are cemented to each other.

The filter 470 and the cover glass 475 are made of glass material and located between the sixth lens element 460 and the image surface 480, and will not affect the focal length of the photographing optical lens system. The image sensor 490 is disposed on or near the image surface 480 of the photographing optical lens system.

In this embodiment, the absolute value of a focal length of the first lens element 410 is the largest among the absolute values of focal lengths of the six lens elements (the first lens element 410, the second lens element 420, the third lens element 430, the fourth lens element 440, the fifth lens element 450 and the sixth lens element 460). In detail, the absolute value of the focal length of the first lens element 410 is 8.96. In addition, when the focal length of the first lens element 410 is f1, and the focal length of the third lens element 430 is f3, the following condition is satisfied: |f3|<|f1|. The absolute value of the focal length of the third lens element 430 is 3.97.

In this embodiment, there are two lens elements having Abbe numbers between 10.0 and 25.0. In detail, the Abbe number of the fourth lens element 440 is 23.5, and the Abbe number of the fifth lens element 450 is 23.5.

The detailed optical data of the 4th embodiment are shown in Table 7 and the aspheric surface data are shown in Table 8 below.

TABLE 7

4th Embodiment
f = 0.80 mm, Fno = 2.00, HFOV = 100.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.418 | | 1.250 | Glass | 1.569 | 56.1 | −8.96 |
| 2 | | 3.483 | | 1.573 | | | | |
| 3 | Lens 2 | 4.084 | (ASP) | 0.507 | Plastic | 1.544 | 55.9 | −2.08 |
| 4 | | 0.848 | (ASP) | 1.624 | | | | |
| 5 | Lens 3 | −3.217 | (ASP) | 0.448 | Plastic | 1.544 | 55.9 | −3.97 |
| 6 | | 6.859 | (ASP) | 0.050 | | | | |
| 7 | Lens 4 | 2.227 | (ASP) | 1.135 | Plastic | 1.639 | 23.5 | 1.84 |
| 8 | | −2.003 | (ASP) | 0.143 | | | | |
| 9 | Ape. Stop | Plano | | 0.105 | | | | |
| 10 | Lens 5 | 8.456 | (ASP) | 0.430 | Plastic | 1.639 | 23.5 | −1.05 |
| 11 | | 0.608 | (ASP) | 0.030 | Cemented | 1.485 | 53.2 | |
| 12 | Lens 6 | 0.463 | (ASP) | 1.697 | Plastic | 1.544 | 55.9 | 0.95 |
| 13 | | −1.342 | (ASP) | 0.400 | | | | |
| 14 | Filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 0.908 | | | | |
| 18 | Image | Plano | | — | | | | |

Note:
Reference wavelength is 587.6 nm (d-line).

TABLE 8

Aspheric Coefficients

| | Surface # | | | | |
|---|---|---|---|---|---|
| | 3 | 4 | 5 | 6 | 7 |
| k = | −6.3374E+00 | −9.8101E−01 | 3.8658E+00 | 1.2131E+01 | −2.3960E−01 |
| A4 = | −1.3288E−02 | −4.1435E−02 | −2.2530E−01 | −1.3429E−01 | 1.0870E−01 |
| A6 = | 2.2711E−03 | −4.5008E−03 | 2.5836E−01 | 1.7165E−01 | −5.7458E−02 |
| A8 = | −1.4782E−04 | −4.3897E−03 | −1.1718E−01 | −1.1006E−01 | 2.4216E−02 |
| A10 = | 4.0449E−06 | 3.0989E−03 | 2.3794E−02 | 3.2402E−02 | — |

| | Surface # | | | | |
|---|---|---|---|---|---|
| | 8 | 10 | 11 | 12 | 13 |
| k = | −3.3053E+00 | 9.9000E+01 | −8.6495E−01 | −2.8665E+00 | −4.9544E+00 |
| A4 = | 4.3427E−01 | 4.9278E−01 | −1.5244E−01 | 6.0806E−02 | −1.5586E−01 |
| A6 = | −6.2947E−01 | −1.2106E+00 | −5.0920E−02 | 8.5445E−01 | 1.5539E−01 |
| A8 = | 8.8754E−01 | 1.5912E+00 | −1.2482E−01 | −1.3535E+00 | −9.7177E−02 |
| A10 = | −6.1673E−01 | −9.2711E−01 | 6.6756E−02 | 5.7004E−01 | 3.4756E−02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.80 | f/f2 | −0.38 |
| Fno | 2.00 | f/f4 | 0.43 |
| HFOV [deg.] | 100.0 | f3/f4 | −2.15 |
| V4 + V5 | 47.0 | (|f2| + |f3|)/|f1| | 0.67 |
| T23/T12 | 1.03 | (|SAG52| − |SAG61|)/f | −0.0190 |
| T34/T56 | 1.67 | D [mm] | 0.03 |
| R11/CT6 | 0.27 | f/EPD | 2.00 |
| R11/Y61 | 0.50 | f/TL | 0.07 |
| R2/R4 | 4.11 | ImgH/f | 2.31 |
| (R5 + R6)/(R5 − R6) | −0.36 | TL/ImgH | 6.04 |
| (R7 + R8)/(R7 − R8) | 0.05 | SD/TD | 0.25 |
| (R9 + R10)/(R9 − R10) | 1.15 | — | — |

5th Embodiment

Figure 9:
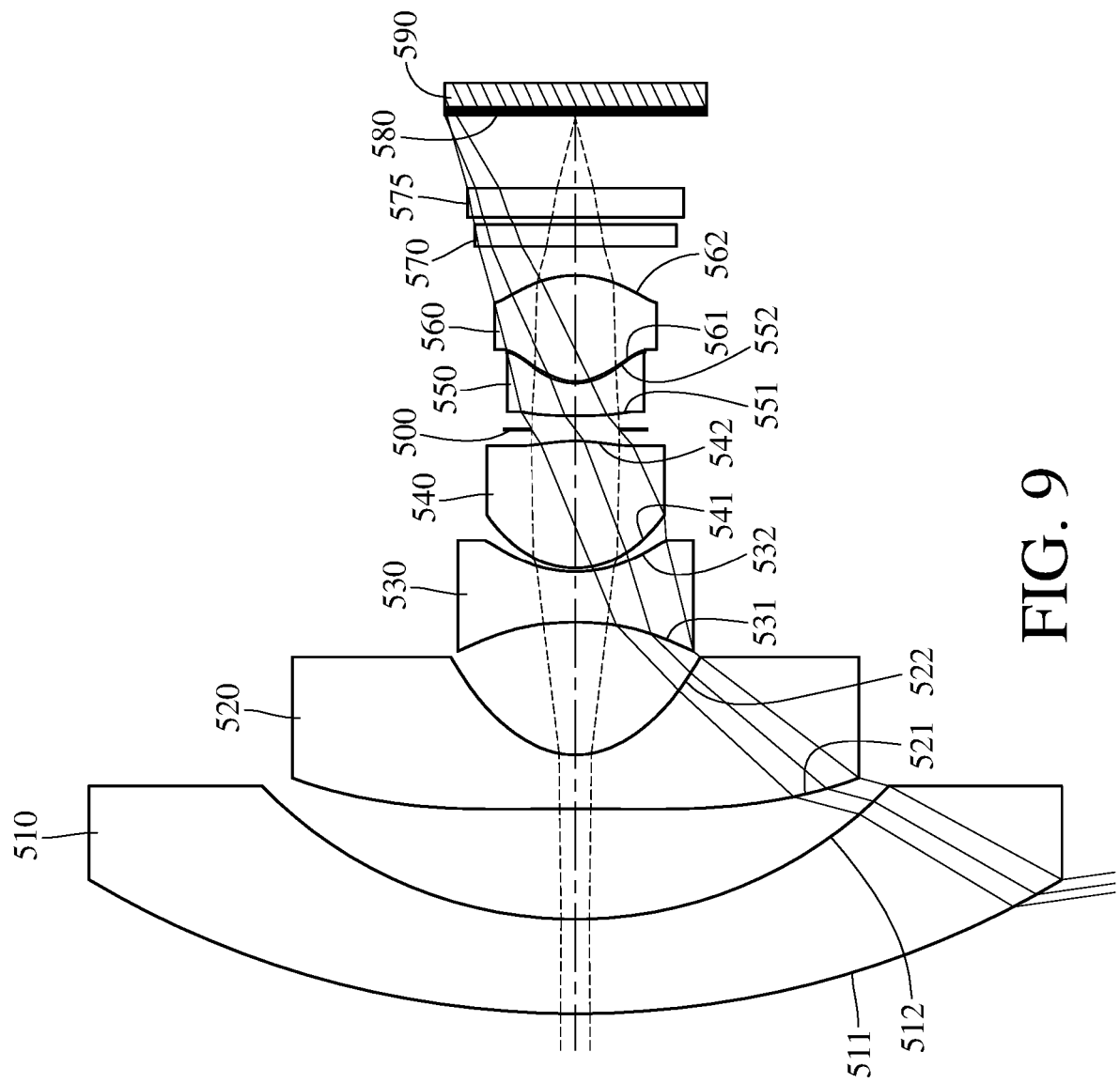
FIG. 9 is a schematic view of an image capturing unit according to the 5th embodiment of the present disclosure.
Figure 10:
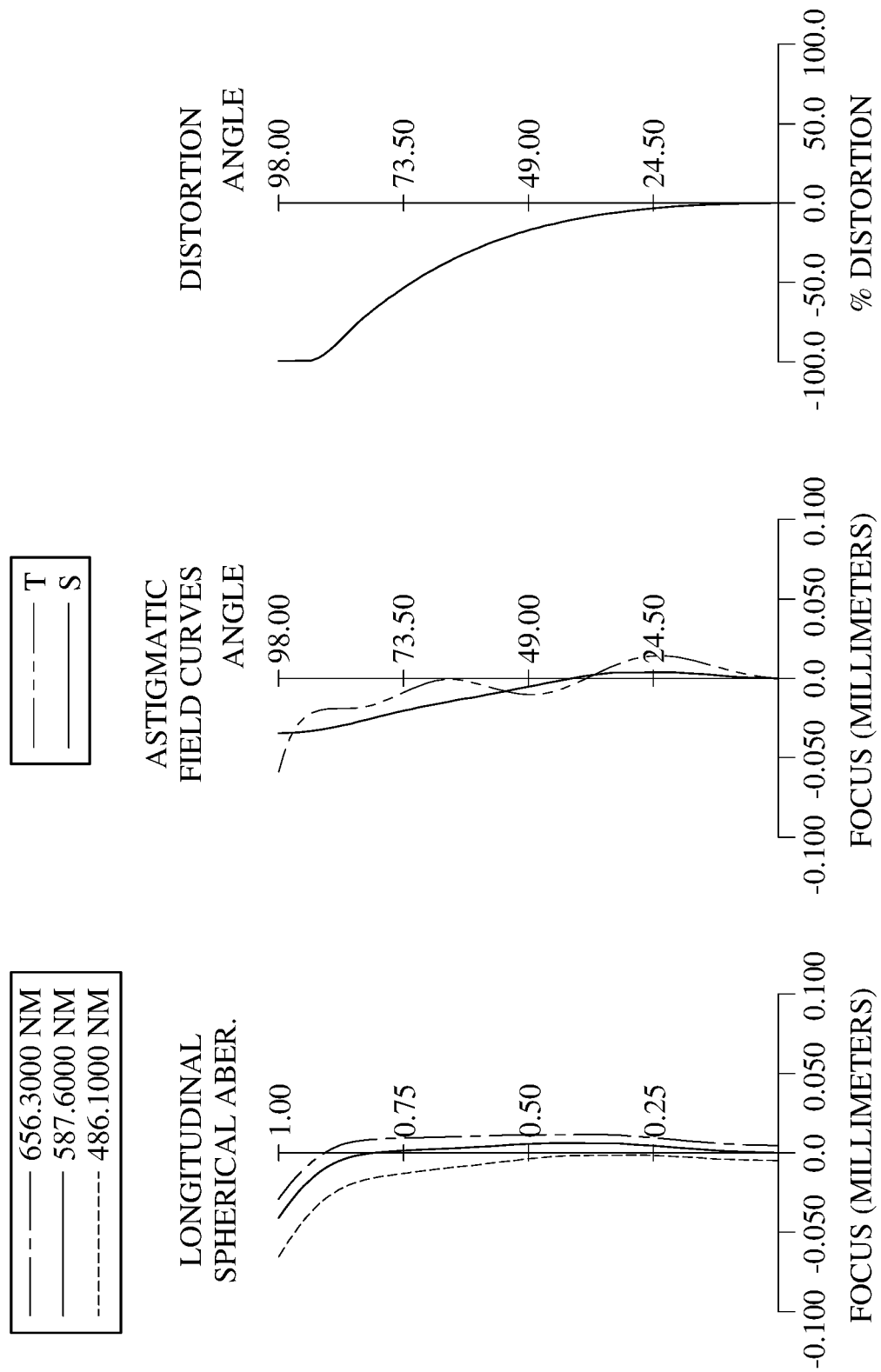
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens system (its reference numeral is omitted) of the present disclosure and an image sensor 590. The photographing optical lens system includes, in order from an object side to an image side, a first lens element 510, a second lens element 520, a third lens element 530, a fourth lens element 540, an aperture stop 500, a fifth lens element 550, a sixth lens element 560, a filter 570, a cover glass 575 and an image surface 580. The photographing optical lens system includes six lens elements (510, 520, 530, 540, 550 and 560) with no additional lens element disposed between each of the adjacent six lens elements.

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both spherical.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has two inflection points.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 and the image-side surface 552 of the fifth lens element 550 are cemented to each other.

The filter 570 and the cover glass 575 are made of glass material and located between the sixth lens element 560 and the image surface 580, and will not affect the focal length of the photographing optical lens system. The image sensor 590 is disposed on or near the image surface 580 of the photographing optical lens system.

In this embodiment, the absolute value of a focal length of the first lens element 510 is the largest among the absolute values of focal lengths of the six lens elements (the first lens element 510, the second lens element 520, the third lens element 530, the fourth lens element 540, the fifth lens element 550 and the sixth lens element 560). In detail, the absolute value of the focal length of the first lens element 510 is 14.97. In addition, when the focal length of the first lens element 510 is f1, and the focal length of the third lens element 530 is f3, the following condition is satisfied: |f3|<|f1|. The absolute value of the focal length of the third lens element 530 is 2.35, The detailed optical data of the 5th embodiment are shown in Table 9 and the aspheric surface data are shown in Table 10 below.

TABLE 9

5th Embodiment
f = 0.81 mm, Fno = 2.00, HFOV = 98.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 13.077 | 1.300 | Glass | 1.804 | 46.6 | −14.97 |
| 2 | | 5.991 | 1.520 | | | | |
| 3 | Lens 2 | −57.140 (ASP) | 0.742 | Plastic | 1.544 | 55.9 | −2.11 |

TABLE 9-continued

5th Embodiment
f = 0.81 mm, Fno = 2.00, HFOV = 98.0 deg.

| Surface # | | Curvature Radius | | Thickness | Material | Index | Abbe # | Focal Length |
|---|---|---|---|---|---|---|---|---|
| 4 | | 1.174 | (ASP) | 1.826 | | | | |
| 5 | Lens 3 | −4.489 | (ASP) | 0.699 | Plastic | 1.544 | 55.9 | −2.35 |
| 6 | | 1.880 | (ASP) | 0.050 | | | | |
| 7 | Lens 4 | 1.252 | (ASP) | 1.754 | Plastic | 1.582 | 30.2 | 1.66 |
| 8 | | −2.073 | (ASP) | 0.160 | | | | |
| 9 | Ape. Stop | Plano | | 0.188 | | | | |
| 10 | Lens 5 | 30.384 | (ASP) | 0.444 | Plastic | 1.639 | 23.5 | −1.27 |
| 11 | | 0.785 | (ASP) | 0.030 | Cemented | 1.485 | 53.2 | |
| 12 | Lens 6 | 0.573 | (ASP) | 1.457 | Plastic | 1.544 | 55.9 | 1.01 |
| 13 | | −1.408 | (ASP) | 0.400 | | | | |
| 14 | Filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 1.004 | | | | |
| 18 | Image | Plano | | — | | | | |

Note:
Reference wavelength is 587.6 nm (d-line).

TABLE 10

Aspheric Coefficients

| | Surface # | | | | |
|---|---|---|---|---|---|
| | 3 | 4 | 5 | 6 | 7 |
| k = | 7.3575E+01 | −9.3042E−01 | 1.0815E+00 | 1.0167E+00 | −6.0527E−01 |
| A4 = | 4.6949E−03 | −5.5552E−03 | −5.5518E−02 | 5.9436E−02 | 9.8848E−02 |
| A6 = | −2.2611E−04 | −6.3566E−03 | 2.9406E−02 | −1.9857E−01 | −1.6201E−01 |
| A8 = | 5.0629E−06 | 7.8876E−03 | −6.2439E−03 | 1.7100E−01 | 1.3817E−01 |
| A10 = | 1.3764E−08 | −1.5704E−03 | 5.1981E−04 | −6.4031E−02 | −4.1199E−02 |

| | Surface # | | | | |
|---|---|---|---|---|---|
| | 8 | 10 | 11 | 12 | 13 |
| k = | −2.0373E+00 | −9.9000E+01 | −7.6390E−01 | −1.2600E+00 | −7.2144E+00 |
| A4 = | 2.7591E−01 | 3.5013E−01 | 3.1320E−02 | −1.3638E+00 | −2.4898E−01 |
| A6 = | −2.9902E−01 | −7.0587E−01 | −9.1376E−02 | 4.3117E+00 | 2.7429E−01 |
| A8 = | 5.1727E−01 | 7.3247E−01 | −5.6281E−01 | −6.5054E+00 | −2.0487E−01 |
| A10 = | −3.5720E−01 | −2.5080E−01 | 4.1081E−01 | 4.2055E+00 | 8.2703E−02 |
| A12 = | — | — | −7.4111E−02 | −9.4295E−01 | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.81 | f/f2 | −0.39 |
| Fno | 2.00 | f/f4 | 0.49 |
| HFOV [deg.] | 98.0 | f3/f4 | −1.41 |
| V4 + V5 | 53.7 | (|f2| + |f3|)/|f1| | 0.30 |
| T23/T12 | 1.20 | (|SAG52| − |SAG61|)/f | −0.0119 |
| T34/T56 | 1.67 | D [mm] | 0.03 |
| R11/CT6 | 0.39 | f/EPD | 2.00 |
| R11/Y61 | 0.60 | f/TL | 0.07 |

-continued

| 5th Embodiment | | | |
|---|---|---|---|
| R2/R4 | 5.10 | ImgH/f | 2.22 |
| (R5 + R6)/(R5 − R6) | 0.41 | TL/ImgH | 6.88 |
| (R7 + R8)/(R7 − R8) | −0.25 | SD/TD | 0.21 |
| (R9 + R10)/(R9 − R10) | 1.05 | — | — |

6th Embodiment

Figure 11:
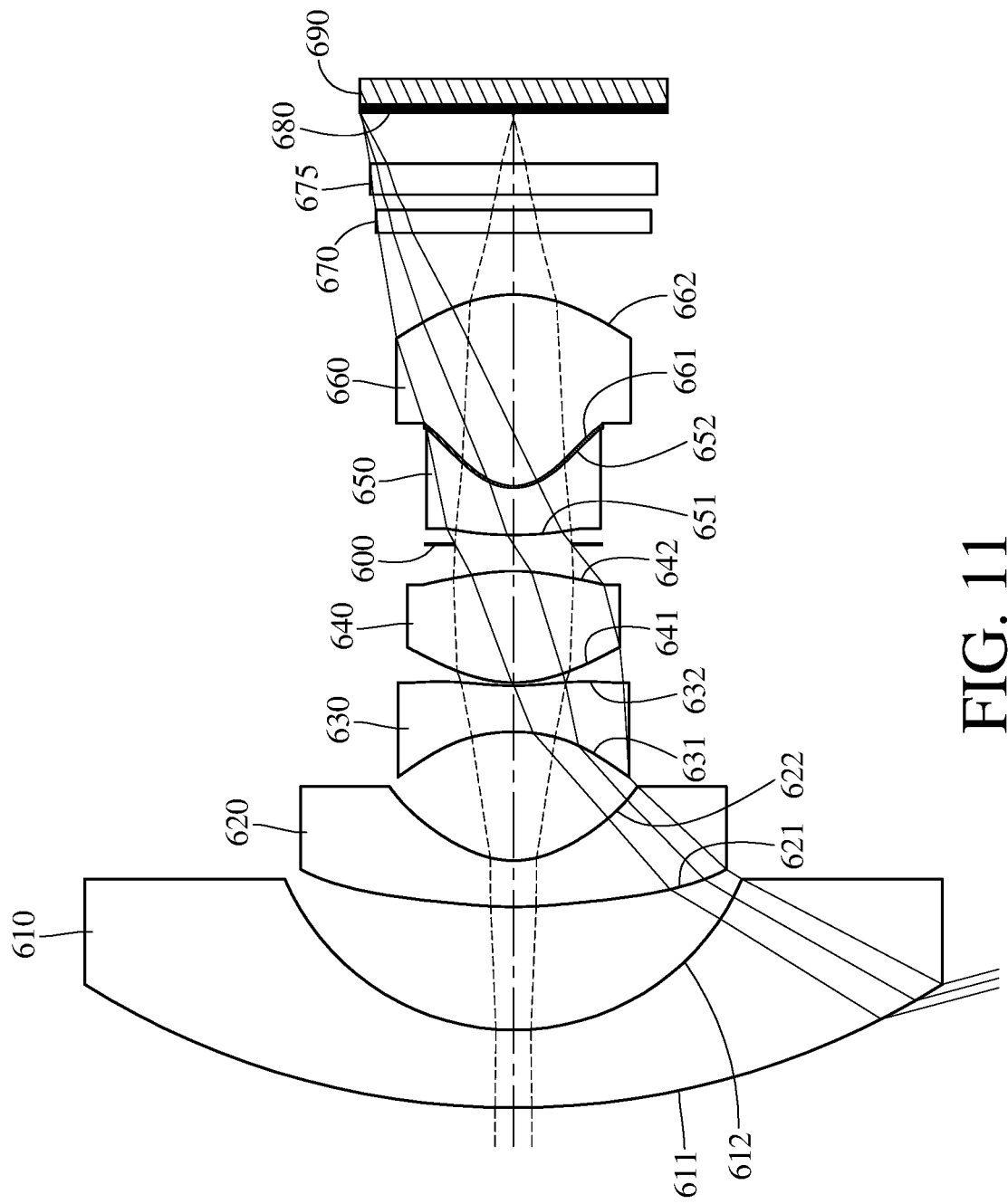
FIG. 11 is a schematic view of an image capturing unit according to the 6th embodiment of the present disclosure.
Figure 12:
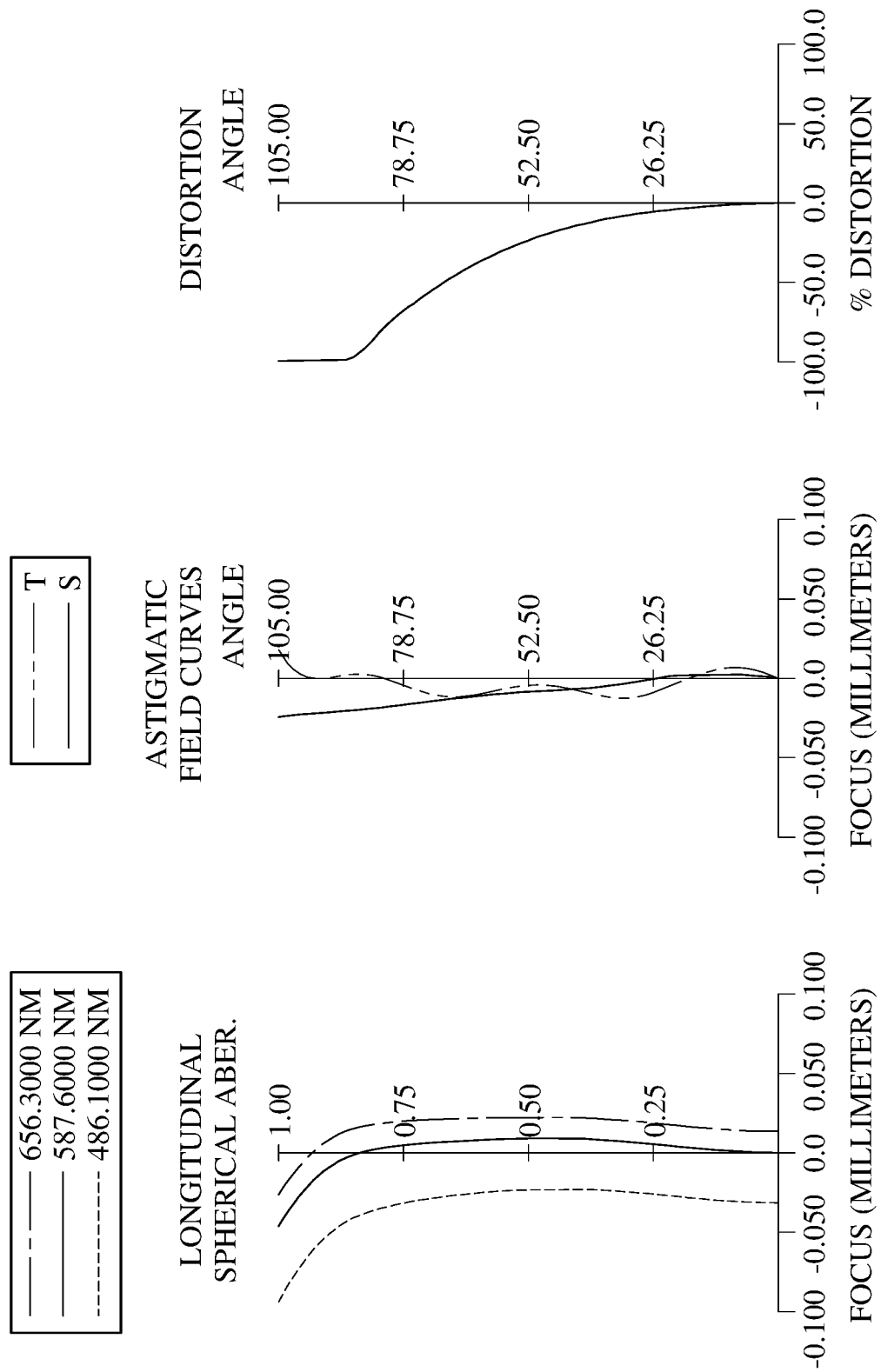
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens system (its reference numeral is omitted) of the present disclosure and an image sensor 690. The photographing optical lens system includes, in order from an object side to an image side, a first lens element 610, a second lens element 620, a third lens element 630, a fourth lens element 640, an aperture stop 600, a fifth lens element 650, a sixth lens element 660, a filter 670, a cover glass 675 and an image surface 680. The photographing optical lens system includes six lens elements (610, 620, 630, 640, 650 and 660) with no additional lens element disposed between each of the adjacent six lens elements.

The first lens element 610 with negative refractive power has an object-side surface 611 being convex in a paraxial region thereof and an image-side surface 612 being concave in a paraxial region thereof. The first lens element 610 is made of glass material and has the object-side surface 611 and the image-side surface 612 being both spherical.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has two inflection points.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 and the image-side surface 652 of the fifth lens element 650 are cemented to each other.

The filter 670 and the cover glass 675 are made of glass material and located between the sixth lens element 660 and the image surface 680, and will not affect the focal length of the photographing optical lens system. The image sensor 690 is disposed on or near the image surface 680 of the photographing optical lens system.

In this embodiment, the absolute value of a focal length of the first lens element 610 is the largest among the absolute values of focal lengths of the six lens elements (the first lens element 610, the second lens element 620, the third lens element 630, the fourth lens element 640, the fifth lens element 650 and the sixth lens element 660). In detail, the absolute value of the focal length of the first lens element 610 is 5.52. In addition, when the focal length of the first lens element 610 is f1, the focal length of the second lens element 620 is f2, and the focal length of the third lens element 630 is f3, the following conditions are satisfied: |f3|<|f1| and |f3|<|f2|. The absolute value of the focal length of the second lens element 620 is 3.00, and the absolute value of the focal length of the third lens element 630 is 2.52.

In this embodiment, there are two lens elements having Abbe numbers between 10.0 and 25.0. In detail, the Abbe number of the fourth lens element 640 is 23.5, and the Abbe number of the fifth lens element 650 is 23.5.

The detailed optical data of the 6th embodiment are shown in Table 11 and the aspheric surface data are shown in Table 12 below.

TABLE 11

6th Embodiment
f = 0.95 mm, Fno = 2.00, HFOV = 105.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.453 | | 1.010 | Glass | 1.904 | 31.4 | −5.52 |
| 2 | | 3.221 | | 1.598 | | | | |
| 3 | Lens 2 | 4.529 | (ASP) | 0.600 | Plastic | 1.544 | 56.0 | −3.00 |
| 4 | | 1.145 | (ASP) | 1.672 | | | | |
| 5 | Lens 3 | −2.366 | (ASP) | 0.600 | Plastic | 1.544 | 56.0 | −2.52 |
| 6 | | 3.552 | (ASP) | 0.040 | | | | |
| 7 | Lens 4 | 1.642 | (ASP) | 1.447 | Plastic | 1.639 | 23.5 | 1.79 |
| 8 | | −2.451 | (ASP) | 0.350 | | | | |
| 9 | Ape. Stop | Plano | | 0.120 | | | | |
| 10 | Lens 5 | 5.415 | (ASP) | 0.608 | Plastic | 1.639 | 23.5 | −1.27 |
| 11 | | 0.676 | (ASP) | 0.030 | Cemented | 1.485 | 53.2 | |
| 12 | Lens 6 | 0.594 | (ASP) | 2.482 | Plastic | 1.544 | 56.0 | 1.30 |
| 13 | | −1.759 | (ASP) | 0.800 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 0.658 | | | | |
| 18 | Image | Plano | | — | | | | |

Note:
Reference wavelength is 587.6 nm (d-line).

TABLE 12

Aspheric Coefficients

| Surface # | | | | |
|---|---|---|---|---|
| 3 | 4 | 5 | 6 | 7 |
| k = −9.0000E+01 | −3.8376E+00 | −2.3663E+00 | 7.1968E−01 | −2.4470E+00 |
| A4 = 2.5756E−03 | 8.6193E−02 | −9.0587E−02 | −1.2485E−01 | −1.1196E−02 |
| A6 = 1.6755E−04 | −3.2543E−02 | 3.6234E−02 | 3.3453E−02 | 9.5720E−03 |
| A8 = 5.0043E−06 | 7.0724E−03 | −4.6702E−03 | −2.2316E−03 | −3.2405E−03 |

| Surface # | | | | |
|---|---|---|---|---|
| 8 | 10 | 11 | 12 | 13 |
| k = −3.9388E−03 | −8.4816E+00 | −1.0968E+00 | −2.1380E+00 | −1.1047E+00 |
| A4 = 1.2149E−01 | 9.2814E−02 | 1.5131E−01 | 5.4021E−01 | 1.4730E−02 |
| A6 = −5.3710E−02 | −1.2400E−01 | −3.4859E−01 | −6.2414E−01 | −3.2640E−04 |
| A8 = 8.5247E−03 | 3.3452E−02 | 1.6334E−01 | 2.3638E−01 | −5.0326E−05 |
| A10 = — | 2.3761E−02 | −1.9811E−02 | −2.2790E−02 | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.95 | f/f2 | −0.32 |
| Fno | 2.00 | f/f4 | 0.53 |
| HFOV [deg.] | 105.0 | f3/f4 | −1.41 |
| V4 + V5 | 47.0 | (|f2| + |f3|)/|f1| | 1.00 |
| T23/T12 | 1.05 | (|SAG52| − |SAG61|)/f | −0.0398 |
| T34/T56 | 1.33 | D [mm] | 0.03 |
| R11/CT6 | 0.24 | f/EPD | 2.00 |
| R11/Y61 | 0.51 | f/TL | 0.07 |
| R2/R4 | 2.81 | ImgH/f | 2.10 |
| (R5 + R6)/(R5 − R6) | −0.20 | TL/ImgH | 6.48 |
| (R7 + R8)/(R7 − R8) | −0.20 | SD/TD | 0.31 |
| (R9 + R10)/(R9 − R10) | 1.29 | — | — |

7th Embodiment

Figure 13:
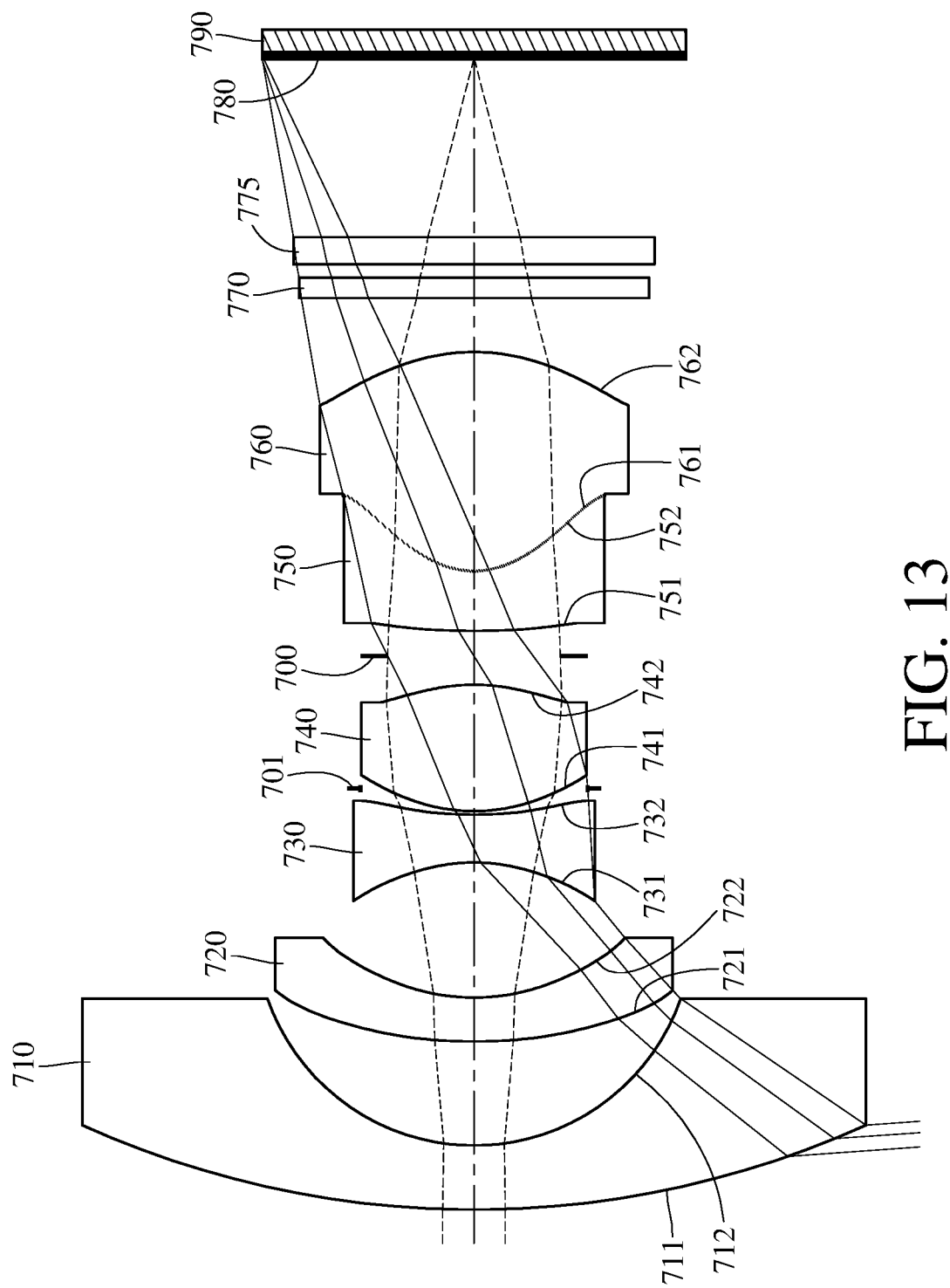
FIG. 13 is a schematic view of an image capturing unit according to the 7th embodiment of the present disclosure.
Figure 14:
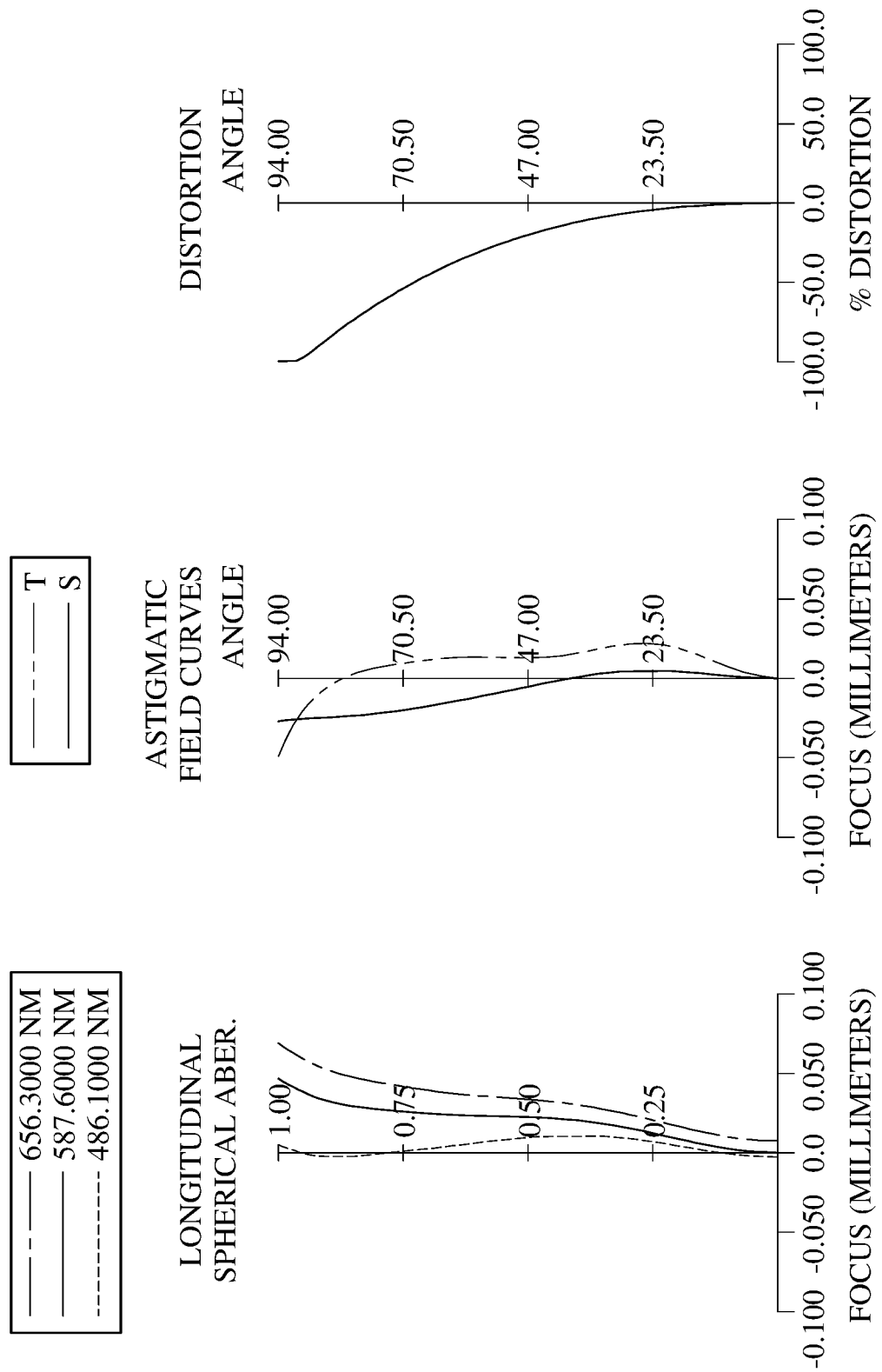
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens system (its reference numeral is omitted) of the present disclosure and an image sensor 790. The photographing optical lens system includes, in order from an object side to an image side, a first lens element 710, a second lens element 720, a third lens element 730, a stop 701, a fourth lens element 740, an aperture stop 700, a fifth lens element 750, a sixth lens element 760, a filter 770, a cover glass 775 and an image surface 780. The photographing optical lens system includes six lens elements (710, 720, 730, 740, 750 and 760) with no additional lens element disposed between each of the adjacent six lens elements.

The first lens element 710 with negative refractive power has an object-side surface 711 being convex in a paraxial region thereof and an image-side surface 712 being concave in a paraxial region thereof. The first lens element 710 is made of glass material and has the object-side surface 711 and the image-side surface 712 being both spherical.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has an inflection point.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 and the image-side surface 752 of the fifth lens element 750 are cemented to each other.

The filter 770 and the cover glass 775 are made of glass material and located between the sixth lens element 760 and the image surface 780, and will not affect the focal length of the photographing optical lens system. The image sensor 790 is disposed on or near the image surface 780 of the photographing optical lens system.

When a focal length of the first lens element 710 is f1, a focal length of the second lens element 720 is f2, and a focal length of the third lens element 730 is f3, the following conditions are satisfied: |f3|<|f1| and |f3|<|f2|. In detail, the absolute value of the focal length of the first lens element 710 is 5.54, the absolute value of the focal length of the second lens element 720 is 9.91, and the absolute value of the focal length of the third lens element 730 is 3.42.

The detailed optical data of the 7th embodiment are shown in Table 13 and the aspheric surface data are shown in Table 14 below.

TABLE 13

7th Embodiment
f = 1.85 mm, Fno = 2.00, HFOV = 94.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 14.049 | | 0.950 | Glass | 1.804 | 46.6 | −5.44 |
| 2 | | 3.237 | | 1.542 | | | | |
| 3 | Lens 2 | 7.880 | (ASP) | 0.650 | Plastic | 1.544 | 55.9 | −9.91 |
| 4 | | 3.108 | (ASP) | 2.002 | | | | |
| 5 | Lens 3 | −2.615 | (ASP) | 0.710 | Plastic | 1.544 | 55.9 | −3.42 |
| 6 | | 7.048 | (ASP) | 0.386 | | | | |
| 7 | Stop | Plano | | −0.336 | | | | |
| 8 | Lens 4 | 2.656 | (ASP) | 1.873 | Plastic | 1.582 | 30.2 | 2.66 |
| 9 | | −2.757 | (ASP) | 0.427 | | | | |
| 10 | Ape. Stop | Plano | | 0.372 | | | | |
| 11 | Lens 5 | 14.742 | (ASP) | 0.871 | Plastic | 1.639 | 23.5 | −2.16 |
| 12 | | 1.234 | (ASP) | 0.030 | Cemented | 1.485 | 53.2 | |
| 13 | Lens 6 | 1.142 | (ASP) | 3.230 | Plastic | 1.544 | 55.9 | 2.10 |
| 14 | | −2.910 | (ASP) | 0.800 | | | | |
| 15 | Filter | Plano | | 0.300 | Glass | 1.517 | 64.2 | — |
| 16 | | Plano | | 0.200 | | | | |
| 17 | Cover glass | Plano | | 0.400 | Glass | 1.517 | 64.2 | — |
| 18 | | Plano | | 2.633 | | | | |
| 19 | Image | Plano | | — | | | | |

Note:
Reference wavelength is 587.6 nm (d-line).
An effective radius of the stop 701 (Surface 7) is 1.680 mm.

TABLE 14

Aspheric Coefficients

| | Surface # | | | | |
|---|---|---|---|---|---|
| | 3 | 4 | 5 | 6 | 8 |
| k = | 5.0682E+00 | −1.9213E+00 | −3.0021E−01 | −3.5366E+01 | −1.4367E+00 |
| A4 = | 5.2010E−03 | 1.0399E−02 | 2.0303E−02 | 3.8083E−02 | 9.9618E−03 |
| A6 = | −1.7891E−03 | −2.8216E−03 | −5.4447E−03 | −1.3645E−02 | −3.5582E−03 |
| A8 = | 1.9485E−04 | 2.4452E−04 | 1.0180E−03 | 9.6639E−04 | 4.7984E−04 |
| A10 = | −7.2176E−06 | 3.2255E−05 | −1.1445E−04 | — | — |

| | Surface # | | | | |
|---|---|---|---|---|---|
| | 9 | 11 | 12 | 13 | 14 |
| k = | −4.5305E+00 | 4.1760E+01 | −8.5109E−01 | −3.2158E+00 | −6.3266E+00 |
| A4 = | 5.8643E−03 | 2.1997E−02 | −1.4206E−02 | 7.9724E−02 | −2.2822E−02 |
| A6 = | 2.4719E−04 | −1.2883E−02 | −6.1092E−03 | −1.7646E−02 | 5.7088E−03 |
| A8 = | 4.5695E−04 | 3.2395E−03 | 1.2112E−04 | 1.9350E−04 | −9.9930E−04 |
| A10 = | — | −4.0252E−04 | −9.0798E−05 | 2.0976E−05 | 8.9125E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.85 | f/f2 | −0.19 |
| Fno | 2.00 | f/f4 | 0.70 |
| HFOV [deg.] | 94.0 | f3/f4 | −1.28 |
| V4 + V5 | 53.7 | (|f2| + |f3|)/|f1| | 2.45 |
| T23/T12 | 1.30 | (|SAG52| − |SAG61|)/f | −0.0021 |
| T34/T56 | 1.67 | D [mm] | 0.03 |
| R11/CT6 | 0.35 | f/EPD | 2.00 |
| R11/Y61 | 0.59 | f/TL | 0.11 |
| R2/R4 | 1.04 | ImgH/f | 1.69 |
| (R5 + R6)/(R5 − R6) | −0.46 | TL/ImgH | 5.43 |
| (R7 + R8)/(R7 − R8) | −0.02 | SD/TD | 0.35 |
| (R9 + R10)/(R9 − R10) | 1.18 | — | — |

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising six lens elements, the six lens elements being, in order from an object side to an image side, a first lens element, a second lens element, a third lens element, a fourth lens element, a fifth lens element and a sixth lens element, wherein the first lens element has negative refractive power, the second lens element has negative refractive power, the third lens element with negative refractive power has an image-side surface being concave in a paraxial region thereof, the fourth lens element has positive refractive power, the fifth lens element with negative refractive power has an image-side surface being concave in a paraxial region thereof, and the sixth lens element has positive refractive power;

wherein a curvature radius of an object-side surface of the third lens element is R5, a curvature radius of the image-side surface of the third lens element is R6, an axial distance between the first lens element and the second lens element is T12, an axial distance between the second lens element and the third lens element is T23, an axial distance between the third lens element and the fourth lens element is T34, an axial distance between the fifth lens element and the sixth lens element is T56, a focal length of the photographing optical lens system is f, an axial distance between an object-side surface of the first lens element and an image surface is TL, and the following conditions are satisfied:

$-0.50<(R5+R6)/(R5-R6)<2.0;$ $0.95<T23/T12<10.0;$ $1.33 \leq T34/T56<5.0;$ and $0<f/TL<0.65;$ wherein a focal length of the first lens element is f1, a focal length of the second lens element is f2, a focal length of the third lens element is f3, and at least one of the following conditions is satisfied:

$|f3|<|f2|;$ and $|f3|<|f1|.$

2. The photographing optical lens system of claim 1, wherein the first lens element has an object-side surface being convex in a paraxial region thereof and an image-side surface being concave in a paraxial region thereof, an Abbe number of the fourth lens element is V4, an Abbe number of the fifth lens element is V5, and the following condition is satisfied:

$20<V4+V5<50.$

3. The photographing optical lens system of claim 1, wherein the curvature radius of the object-side surface of the third lens element is R5, the curvature radius of the image-side surface of the third lens element is R6, and the following condition is satisfied:

$-0.30<(R5+R6)/(R5-R6)<1.0.$

4. The photographing optical lens system of claim 1, wherein the focal length of the photographing optical lens system is f, a focal length of the fourth lens element is f4, and the following condition is satisfied:

$0.34<f/f4<1.0.$

5. The photographing optical lens system of claim 1, wherein a curvature radius of an object-side surface of the fourth lens element is R7, a curvature radius of an image-side surface of the fourth lens element is R8, and the following condition is satisfied:

$-0.50<(R7+R8)/(R7-R8)<0.10.$

6. The photographing optical lens system of claim 1, wherein a curvature radius of an image-side surface of the first lens element is R2, a curvature radius of an image-side surface of the second lens element is R4, and the following condition is satisfied:

$2.40<R2/R4<15.0.$

7. The photographing optical lens system of claim 1, wherein the focal length of the first lens element is f1, the focal length of the second lens element is f2, the focal length of the third lens element is f3, and the following condition is satisfied:

$0<(|f2|+|f3|)/|f1|<0.70.$

8. The photographing optical lens system of claim 1, wherein the fifth lens element and the sixth lens element are cemented to each other, a curvature radius of an object-side surface of the sixth lens element is R11, a maximum effective radius of the object-side surface of the sixth lens element is Y61, and the following condition is satisfied:

$0.20<R11/Y61<0.97.$

9. The photographing optical lens system of claim 1, wherein the fifth lens element and the sixth lens element are cemented to each other, a central thickness of an adhesive layer between the image-side surface of the fifth lens element and an object-side surface of the sixth lens element is D, and the following condition is satisfied:

0.01 [mm]<D<0.05 [mm].

10. A photographing optical lens system comprising six lens elements, the six lens elements being, in order from an object side to an image side, a first lens element, a second lens element, a third lens element, a fourth lens element, a fifth lens element and a sixth lens element, wherein the first lens element has negative refractive power, the second lens element has negative refractive power, the third lens element with negative refractive power has an image-side surface being concave in a paraxial region thereof, the fourth lens element has positive refractive power, the fifth lens element with negative refractive power has an image-side surface being concave in a paraxial region thereof, and the sixth lens element has positive refractive power;
wherein a curvature radius of an object-side surface of the third lens element is R5, a curvature radius of the image-side surface of the third lens element is R6, an axial distance between the first lens element and the second lens element is T12, an axial distance between the second lens element and the third lens element is T23, an axial distance between the third lens element and the fourth lens element is T34, an axial distance between the fifth lens element and the sixth lens element is T56, a focal length of the photographing optical lens system is f, a focal length of the third lens element is f3, a focal length of the fourth lens element is f4, an axial distance between an object-side surface of the first lens element and an image surface is TL, and the following conditions are satisfied:

$-1.0<(R5+R6)/(R5-R6)<2.0$;

$0.95<T23/T12<10.0$;

$1.33 \le T34/T56<5.0$;

$0<f/TL<0.65$; and $-3.0<f3/f4<0$;

wherein a focal length of the first lens element is f1, a focal length of the second lens element is f2, the focal length of the third lens element is f3, and at least one of the following conditions is satisfied:

$|f3|<|f2|$; and $|f3|<|f1|$.

11. The photographing optical lens system of claim 10, wherein the second lens element has an object-side surface being convex in a paraxial region thereof, and the second lens element has an image-side surface being concave in a paraxial region thereof.

12. The photographing optical lens system of claim 10, wherein the fifth lens element has an object-side surface being convex in a paraxial region thereof.

13. The photographing optical lens system of claim 10, wherein the image-side surface of the third lens element has at least one inflection point.

14. The photographing optical lens system of claim 10, wherein a curvature radius of an object-side surface of the fifth lens element is R9, a curvature radius of the image-side surface of the fifth lens element is R10, and the following condition is satisfied:

$0.70<(R9+R10)/(R9-R10)<1.80$.

15. The photographing optical lens system of claim 10, wherein a curvature radius of an object-side surface of the sixth lens element is R11, a central thickness of the sixth lens element is CT6, and the following condition is satisfied:

$0.10<R11/CT6<0.45$.

16. The photographing optical lens system of claim 10, wherein an absolute value of a focal length of the first lens element is the largest among all absolute values of focal lengths of the six lens elements.

17. The photographing optical lens system of claim 10, where the fifth lens element and the sixth lens element are cemented to each other, a displacement in parallel with an optical axis from an axial vertex of the image-side surface of the fifth lens element to a maximum effective radius position of the image-side surface of the fifth lens element is SAG52, a displacement in parallel with the optical axis from an axial vertex of an object-side surface of the sixth lens element to a maximum effective radius position of the object-side surface of the sixth lens element is SAG61, the focal length of the photographing optical lens system is f, and the following condition is satisfied:

$-0.10<(|SAG52|-|SAG61|)/f<0$.

18. The photographing optical lens system of claim 10, further comprising an aperture stop, wherein the focal length of the photographing optical lens system is f, an entrance pupil diameter of the photographing optical lens system is EPD, the axial distance between the object-side surface of the first lens element and the image surface is TL, a maximum image height of the photographing optical lens system is ImgH, an axial distance between the aperture stop and an image-side surface of the sixth lens element is SD, an axial distance between the object-side surface of the first lens element and the image-side surface of the sixth lens element is TD, and the following conditions are satisfied:

$1.0<f/EPD<3.50$;

$3.0<TL/ImgH<8.0$;

$0.15<SD/TD<0.45$; and $1.50<ImgH/f<3.50$.

19. The photographing optical lens system of claim 10, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the i-th lens element is Vi, and at least two of the six lens elements satisfy the following condition:

$10.0<Vi<25.0$, wherein i=1, 2, 3, 4, 5, 6.

20. An image capturing unit, comprising:
the photographing optical lens system of claim 10; and
an image sensor disposed on the image surface of the photographing optical lens system.

21. An electronic device, comprising:
the image capturing unit of claim 20.

22. A photographing optical lens system comprising six lens elements, the six lens elements being, in order from an object side to an image side, a first lens element, a second lens element, a third lens element, a fourth lens element, a fifth lens element and a sixth lens element, wherein the first lens element has negative refractive power, the second lens element has negative refractive power, the third lens element with negative refractive power has an image-side surface being concave in a paraxial region thereof, the fourth lens element has positive refractive power, the fifth lens element with negative refractive power has an image-side surface being concave in a paraxial region thereof, and the sixth lens element has positive refractive power;

wherein a curvature radius of an object-side surface of the third lens element is R5, a curvature radius of the image-side surface of the third lens element is R6, an axial distance between the first lens element and the second lens element is T12, an axial distance between the second lens element and the third lens element is T23, an axial distance between the third lens element and the fourth lens element is T34, an axial distance between the fifth lens element and the sixth lens element is T56, a focal length of the photographing optical lens system is f, a focal length of the second lens element is f2, a focal length of the third lens element is f3, a focal length of the fourth lens element is f4, an Abbe number of the fourth lens element is V4, an Abbe number of the fifth lens element is V5, and the following conditions are satisfied:

$-1.0<(R5+R6)/(R5-R6)<3.0$;

$0.20<T23/T12<50.0$;

$1.33 \leq T34/T56<5.0$;

$-3.0<f3/f4<0$;

$20<V4+V5<50$; and $-0.42<f/f2<0$;

wherein a focal length of the first lens element is f1, the focal length of the second lens element is f2, the focal length of the third lens element is f3, and at least one of the following conditions is satisfied:

$|f3|<|f2|$; and $|f3|<|f1|$.

23. The photographing optical lens system of claim 22, wherein the sixth lens element has an object-side surface being convex in a paraxial region thereof, the sixth lens element has an image-side surface being convex in a paraxial region thereof, the image-side surface of the fifth lens element and the object-side surface of the sixth lens element are both aspheric, and the fifth lens element and the sixth lens element are cemented to each other.

24. The photographing optical lens system of claim 22, wherein the fifth lens element and the sixth lens element are cemented to each other, a central thickness of an adhesive layer between the image-side surface of the fifth lens element and an object-side surface of the sixth lens element is D, and the following condition is satisfied:

$0.01 \text{ [mm]}<D<0.05 \text{ [mm]}$.

25. The photographing optical lens system of claim 22, wherein the focal length of the photographing optical lens system is f, an entrance pupil diameter of the photographing optical lens system is EPD, a maximum image height of the photographing optical lens system is ImgH, and the following conditions are satisfied:

$1.0<f/EPD<2.50$; and $1.50<ImgH/f<3.0$.

26. The photographing optical lens system of claim 22, wherein a maximum effective radius of an object-side surface of the sixth lens element is Y61, a curvature radius of the object-side surface of the sixth lens element is R11, and the following condition is satisfied:

$0.20<R11/Y61<0.97$.

* * * * *